(12) United States Patent
Walsh et al.

(10) Patent No.: US 10,438,281 B2
(45) Date of Patent: Oct. 8, 2019

(54) SYSTEM, METHOD, AND MEDIA FOR TRADING OF ENERGY EFFICIENCY

(75) Inventors: Michael Walsh, Downers Grove, IL (US); Richard L. Sandor, Chicago, IL (US); Jeffrey K. O'Hara, Chicago, IL (US)

(73) Assignee: Chicago Climate Exchange, Inc, Chicago, IL (US)

( * ) Notice: Subject to any disclaimer, the term of this patent is extended or adjusted under 35 U.S.C. 154(b) by 802 days.

(21) Appl. No.: 12/824,769

(22) Filed: Jun. 28, 2010

(65) Prior Publication Data

US 2010/0332275 A1 Dec. 30, 2010
US 2013/0173350 A9 Jul. 4, 2013

Related U.S. Application Data

(63) Continuation-in-part of application No. 10/623,134, filed on Jul. 18, 2003, now abandoned.
(Continued)

(51) Int. Cl.
*G06Q 10/06* (2012.01)
*G06Q 40/04* (2012.01)
(Continued)

(52) U.S. Cl.
CPC ............. *G06Q 40/02* (2013.01); *G06Q 10/06* (2013.01); *G06Q 10/06375* (2013.01);
(Continued)

(58) Field of Classification Search
None
See application file for complete search history.

(56) References Cited

U.S. PATENT DOCUMENTS 7,343,341 B2    3/2008  Sandor et al. ............. 705/37
2004/0039684 A1 2/2004  Sandor ...................... 705/37
(Continued)

FOREIGN PATENT DOCUMENTS

WO    WO 2007/095001 A2    8/2007

OTHER PUBLICATIONS

International Search Report and Written Opinion of the International Searching Authority, application No. PCT/2010/040192, dated Aug. 23, 2010.

*Primary Examiner* — Dennis W Ruhl
(74) *Attorney, Agent, or Firm* — DLA Piper LLP (US)

(57) ABSTRACT

A method for reducing greenhouse gas emissions by promoting more efficient energy use, by establishing a measure of efficiency, defined as a ratio of a measure of energy use to a measure of production; establishing a reduction schedule that sets limits on the energy efficiency ratio, with the schedule covering a series of compliance time periods and requiring efficient energy use during those time periods; establishing a transferable credit representing an amount of energy and establishing a tradable financial instrument representing a number of energy efficiency credits; issuing a plurality of energy efficiency credits to the entities; establishing a trading system to facilitate the sale and purchase of the financial instruments; and requiring entities to comply with the reduction schedule by making operational improvements or acquiring and surrendering credits to thus increase the efficiency of energy use in turn reducing greenhouse gas emissions.

25 Claims, 8 Drawing Sheets

Related U.S. Application Data

(60) Provisional application No. 61/222,011, filed on Jun. 30, 2009, provisional application No. 60/397,401, filed on Jul. 20, 2002.

(51) Int. Cl.
*G06Q 40/02* (2012.01)
*G06Q 50/06* (2012.01)

(52) U.S. Cl.
CPC ............ *G06Q 40/04* (2013.01); *G06Q 50/06* (2013.01); *Y02P 90/845* (2015.11); *Y02P 90/90* (2015.11)

(56) References Cited

U.S. PATENT DOCUMENTS

| | | | |
|---|---|---|---|
| 2005/0246190 A1* | 11/2005 | Sandor et al. | 705/1 |
| 2006/0184445 A1 | 8/2006 | Sandor et al. | 705/37 |
| 2006/0224492 A1 | 10/2006 | Pinkava | 705/37 |
| 2006/0241951 A1 | 10/2006 | Cynamom et al. | 705/1 |
| 2007/0192221 A1* | 8/2007 | Sandor et al. | 705/35 |
| 2008/0015976 A1 | 1/2008 | Sandor et al. | 705/37 |

\* cited by examiner

Energy Efficiency System and Method

Participation in an Energy Efficiency Program

Energy Efficiency Program Compliance

Energy Efficiency Credit Trading System

Forward Auction of Energy Efficiency Credits

Energy Efficiency Credit Trading System

Figure 7 - Energy Efficiency Calculator

Figure 8 - Examples of Compliance Calculations

Historical Data: (Baseline Year = 2010)
- EN: 18
- PR: 20
- EER: 0.9

Reduction Schedule:

| Year | Required EER | Reduction from baseline: |
|---|---|---|
| 2016 | 0.882 | 2.00% |
| 2017 | 0.864 | 4.00% |
| 2018 | 0.846 | 6.00% |
| 2019 | 0.828 | 8.00% |
| 2020 | 0.81 | 10.00% |

KEY:
- RS = Reduction Schedule Value
- EN = Energy Quantity
- PR = Production Quantity
- EEC = Energy Efficiency Credit
- EER = Energy Efficiency Ratio
- UP = Increase
- UP REL = Relative Increase
- DN = Decrease
- DN REL = Relative Decrease
- EST = Estimated PR Quantity

Notes: 1 EEC = 1 unit of energy (so energy use = EECs)

EST PR Value (set equal to baseline production for this example): 20.000
2016 Allocation of EECs (2% reduction in energy use per reduction schedule): 17.640

| | EN = RS PR = EST | EN = UP PR = EST | EN = RS PR = UP | EN = DN PR = EST | EN = RS PR = DN | EN = UP REL PR = UP | EN = UP PR = UP REL | EN = UP PR = UP (same %) | EN = DN REL PR = DN | EN = DN PR = DN REL | EN = DN PR = DN (same %) |
|---|---|---|---|---|---|---|---|---|---|---|---|
| Actual EN Use: | 17.640 | 19.000 | 17.640 | 17.000 | 17.640 | 21.000 | 19.000 | 18.900 | 15.000 | 17.000 | 16.740 |
| Actual PR: | 20.000 | 20.000 | 22.000 | 20.000 | 17.000 | 21.000 | 24.000 | 21.000 | 19.000 | 15.000 | 18.600 |
| PR % Change vs. EST | 0.00% | 0.00% | 10.00% | 0.00% | -15.00% | 5.00% | 20.00% | 5.00% | -5.00% | -25.00% | -7.00% |
| EEC Adjustment: | 0.000 | 0.000 | 1.764 | 0.000 | (2.646) | 0.882 | 3.528 | 0.882 | (0.882) | (4.410) | (1.235) |
| EEC Adjusted Total: | 17.640 | 17.640 | 19.404 | 17.640 | 14.994 | 18.522 | 21.168 | 18.522 | 16.758 | 13.230 | 16.405 |
| EER Actual Value: | 0.882 | 0.950 | 0.802 | 0.850 | 1.038 | 1.000 | 0.792 | 0.900 | 0.789 | 1.133 | 0.900 |
| EER per RS: | 0.882 | 0.882 | 0.882 | 0.882 | 0.882 | 0.882 | 0.882 | 0.882 | 0.882 | 0.882 | 0.882 |
| Complies with RS: | yes | no | yes | yes | no | no | yes | no | yes | no | no |
| Actual EN: | 17.640 | 19.000 | 17.640 | 17.000 | 17.640 | 21.000 | 19.000 | 18.900 | 15.000 | 17.000 | 16.740 |
| Allowed EN Use: | 17.640 | 17.640 | 19.404 | 17.640 | 14.994 | 18.522 | 21.168 | 18.522 | 16.758 | 13.230 | 16.405 |
| Excess EN used: | 0.000 | 1.360 | -1.764 | -0.640 | 2.646 | 2.478 | -2.168 | 0.378 | -1.758 | 3.770 | 0.335 |
| EECs to be Acquired: | 0.000 | 1.360 | 0.000 | 0.000 | 2.646 | 2.478 | 0.000 | 0.378 | 0.000 | 3.770 | 0.335 |
| EECs After True-up: | 0.000 | 0.000 | 1.764 | 0.640 | 0.000 | 0.000 | 2.168 | 0.000 | 1.758 | 0.000 | 0.000 |

SYSTEM, METHOD, AND MEDIA FOR TRADING OF ENERGY EFFICIENCY

CROSS-REFERENCE TO RELATED APPLICATIONS

This application claims the benefit of U.S. Provisional Application No. 61/222,011 filed Jun. 30, 2009, and is a continuation-in-part application of U.S. patent application Ser. No. 10/623,134, filed Jul. 18, 2003, now abandoned which claims priority to U.S. Provisional Patent Application No. 60/397,401, filed Jul. 20, 2002.

FIELD OF THE INVENTION

The present invention relates to a system, method, and media for a computer-implemented system for establishing a measure of efficiency ("energy efficiency ratio") comprising a ratio of a measure of energy use to a measure of production; setting limits on the value of the energy efficiency ratio ("reduction schedule") for a series of compliance time periods; establishing a transferable credit ("energy efficiency credit") representing an amount of energy and a tradable instrument ("energy financial instrument") representing a number of energy efficiency credits; issuing a plurality of energy efficiency credits to participating entities; establishing a computer-implemented trading system to facilitate the sale and purchase of energy financial instruments; and requiring the participating entities to comply with the reduction schedule.

BACKGROUND

The world's environment faces significant threats from anthropogenic or "human-caused" releases of greenhouse gases to the atmosphere. Greenhouse gases, such as water vapor, carbon dioxide, tropospheric ozone, nitrous oxide, and methane, are generally transparent to solar radiation but opaque to longwave radiation, thus preventing longwave radiation energy from leaving the atmosphere. The net effect of greenhouse gases in the atmosphere is a trapping of absorbed radiation and a tendency to warm the planet's surface.

In general, the rapid increases in the concentration of greenhouse gases in the earth's atmosphere caused by human activity increases the risk of fundamental and costly changes in the earth's climate system. Such risks can include more severe drought/precipitation cycles; longer and more extreme heat waves; spread of tropical diseases; damage to vegetation and agricultural systems; and threats to coastlines and property due to higher sea levels and storm surges.

Significant greenhouse gas emissions derive from the electricity production through burning fossil fuels (e.g. coal burning power plants) to supply consumers including businesses that produce goods and provide services. Fossil fuels are also consumed directly by businesses in manufacturing goods or providing services, such as by natural gas powered HVAC systems or by gasoline powered vehicles. Ultimately, the amount of energy produced is determined by the level of demand by consumers. If consumption of energy is decreased, energy generation will decrease, as will the amount of greenhouse gases that are produced by electric power generation or direct fossil fuel consumption. An effective system is needed to encourage consumers of energy to be more efficient.

In the 1980's, the United States implemented an emissions trading system to phase out lead from motor fuel. This effort was followed by a highly successful U.S. Environmental Protection Agency (EPA) sulfur dioxide ($SO_2$) emissions trading program. To reduce acid rain, an overall cap on $SO_2$ emissions was imposed on electric power plants. Utilities that found it expensive to cut sulfur emissions could buy allowances from utilities that make extraordinary cuts at low cost. Emissions were reduced faster than required and costs were far below most forecasts. There has also been steady growth in the trading of allowances, from 700,000 tons in 1995 to approximately 16.9 million tons in 2007 from 4,700 transactions. The $SO_2$ emissions market reached a value of approximately $5.1 billion in 2007.

The environmental and economic success of the U.S. sulfur dioxide allowance trading program to reduce acid rain, as well as other similar markets, provides evidence of the benefits of a cap-and-trade system to encourage desirable behavior. This application describes such a system applied with the goal of reducing energy use relative to production, where the tradable instrument is a unit of energy and compliance requires that an entity achieve a ratio based on the measure of energy consumed to the measure of goods produced, services provided, revenues generated or other activities undertaken. It is a measure of energy efficiency.

Such a system introduces scarcity by making available a limited amount of rights to use energy (i.e. energy credits), establishing requirements that entities achieve a level of energy efficiency (expressed as the ratio), and allowing entities to trade those credits in a market that determines a financial value for the credits. Those who can become more energy efficient at low cost will be incentivised to do so (e.g., as an alternative to purchasing credits), and if they are allowed to sell surplus credits they will be further incentivised to become even more efficient. Companies facing high costs or other barriers to cutting energy use can comply by purchasing energy credits from those who make extra cuts. This approach buffers the potentially disastrous effects of absolute reduction requirements. The market in a property-like instrument—energy credits—helps assure efficient use of energy, thereby reducing greenhouse gas emissions and protecting the environment. It also yields a price that signals the value society places on protecting the environment. That price represents the financial reward paid to those who reduce energy use and also indicates the value of creating innovative energy efficiency techniques.

It would be desirable for such a system to provide for the issuance of energy efficiency credits to entities or projects that do not use significant amounts of energy and accordingly are not required to become more efficient, but which conduct an activity that is beneficial such as generating energy from renewable sources (e.g. wind, hydro, biomass, geothermal, etc.). This feature would provide an additional source of credits to be used by entities that are subject to energy efficiency requirements, while also providing a funding source for environmentally desirable activities.

Many major industrial nations have sought the design of a greenhouse gas emissions trading program that can provide corporations and others an organized, market-based mechanism for cost-effectively reducing global warming gases. Current systems do not effectively address climate change by requiring increased energy efficiency, while offering participating entities significant commercial opportunities.

Examples of barriers to current systems that involve energy efficiency credit trading include regulatory uncertainty; lack of a clear, widely-accepted definition of the commodity; lack of standards for monitoring, verification, and trade documentation; difficulty in efficiently adapting to changes in business (i.e., scalability); difficulty in properly addressing diverse characteristics of multiple business sectors and other energy users; and lack of organized markets and clear market prices. Other barriers and challenges also exist. These barriers significantly impede progress in adoption of such a program and the corresponding greenhouse gas reductions by raising the costs to participating entities and administrators of the program.

Thus, there is a need for a system that reduces energy use relative to production, so that it neither hampers businesses from ramping up production of goods, services or revenues, nor creates a windfall for business that decrease production. The system must be efficient both for the subject energy users and the administrator of the system. An integrated computerized system that limits rights to use energy relative to production, and that allows rights to be transferred on an organized trading system will promote energy efficiency and the reduction of greenhouse gas emissions.

SUMMARY OF THE INVENTION

The invention now satisfies an important need in the art and combines a different set of requirements and a new type of instrument with a cap-and-trade system to effectively address climate change by requiring increased energy efficiency, while offering its participating entities substantial commercial opportunities. This invention is embodied in a method for reducing greenhouse gas emissions through promoting more efficient energy use, by establishing a measure of efficiency ("energy efficiency ratio") defined as a ratio of a measure of energy use to a measure of production to incentivize participating entities to improve efficiency of energy use; establishing a reduction schedule that sets limits on the energy efficiency ratio for the participating entities, the schedule covering a series of compliance time periods and requiring more efficient energy use during those time periods; establishing a transferable credit representing an amount of energy ("energy efficiency credit"); issuing a plurality of energy efficiency credits to the participating entities; establishing a trading system to facilitate the sale and purchase of energy efficiency credits; and requiring the participating entities to comply with the reduction schedule thus increasing efficiency of energy use, and in turn reducing greenhouse gas emissions. The economic incentives of the instant system are a substantial improvement over simply requiring the participating entities to pay an additional amount for energy used or for energy used in excess of a target amount (e.g. taxing energy use). There is no flexibility in such a system, and there is no incentive to reduce more than is required.

Another improvement on the prior art is that the invention facilitates efficiency in trading, the method further comprising establishing a standardized tradable instrument representing a number of energy efficiency credits ("energy financial instrument"). Advantageously, the trading step is carried out by an internet-accessible computer system. By conducting transactions for standardized commodities and simplifying the mechanics of conducting a transaction, the system facilitates lower transaction costs and correspondingly lower compliance costs for the participating entities. Other steps comprising the system, such as registering participating entities, determining baselines, issuing credits, determining compliance, and keeping records are also carried out by computers thereby keeping costs of administration low.

The flexibility of the new system represents a substantial improvement on the traditional approach of simply requiring the participating entities to meet certain absolute operating targets. The traditional approach may create insurmountable hardships for some participating entities that cannot change their operations by any reasonable means, and may force them to cease operations. In general, the participating entities subject to the new system can comply with the reduction schedule by improving the efficiency of operations that utilize the energy, or by acquiring energy efficiency credits or energy financial instruments to offset operational deficiencies. In this way, either reliance upon energy from fossil fuels is reduced or energy efficiency credits or energy financial instruments representing reductions by others are acquired by the participating entities with the net result that greenhouse gas emissions into the atmosphere are reduced. So the instant invention allows the various participating entities to achieve varying degrees of operational energy efficiency, and to make up for difficult to correct operational problems by acquiring credits. As a group the participating entities will still achieve the same measure of energy efficiency (and corresponding reductions of greenhouse gas emissions), but different participating entities will shoulder different burdens.

In contrast, the prior art limits the gross measure of energy use. This causes problems when entities that consume energy change, so it may cause unintended barriers to growth or downsizing. The new system is an improvement over the prior art in that the metric is the measure of energy efficiency, a measure of energy used by a participating entity in relation to generation of revenues, production of products, provision of services or other activities over a specified certain period of time. If a participating entity becomes larger or smaller or produces more or less units of production, the amount of energy it is entitled to use will be adjusted correspondingly. This is true whether the measure of production involves quantities of products produced, services provided, financial revenues generated or other activities accomplished over the same specified certain period of time.

For simplicity and to facilitate automation, participating entities may be required to conform to standard units of measure and pre-defined categories, so for example, the measure of energy use may be expressed as a number of universal energy units calculated from the quantity of the electricity for one of a number of specified types of energy sources consumed, with reference to one of a number of specified types and quantities of activities undertaken, multiplied by a selectable factor. This system effectively encourages some activities and discourages others. For example the system might provide that the measure of energy used does not include energy from certain specified sources, such as and including renewable energy sources, or that energy used in various phases of production or production activities be calculated differently.

The participating entities could become subject to the energy efficiency requirements by virtue of voluntary commitment, or by virtue of legal mandate. Participating entities typically comprise a plurality of businesses and other entities that consume energy in the production of goods, provision of services or generation of profits. Participating entities, however, could further include non-commercial entities or activities such as governmental, residential, personal, recreational, entertainment, etc. The participating entities subject to energy efficiency requirements may include users of energy in a geographic area, users that have certain common characteristics such as energy users in a particular industry, users that conduct a certain activity or range of activities, users whose energy consumption falls in a specified range, users that consume a certain type of energy, or a combination of the foregoing. The participating entities could be defined to include only a part of a business or other entity that is devoted to a particular activity or type of production, or could be an aggregation of multiple entities that have common ownership or some other type of connection. The invention may allow parties that are not covered by the energy efficiency requirements to be participating entities for purposes of owning, buying and selling the subject energy efficiency credits. These parties may include speculators, investors, market makers and other entities that have an interest in owning or buying and selling energy efficiency credits, but that are not required to meet a particular level of energy efficiency.

It may be desirable to set the specified certain compliance period of time to be the same as that used for other business or compliance purposes, such as a calendar year. The invention contemplates that multiple sequential time periods are covered. The invention can be implemented in phases, each involving one or a series of compliance periods, or it can cover a specified set of compliance periods with an end point that does not foreclose adding one or more further compliance periods.

A preferred embodiment of the invention further comprises means for efficiently and consistently determining requirements for energy efficiency. This feature could involve determining a baseline energy efficiency ratio ("baseline") for participating entities from information about the entity's actual historical consumption and production during a specified period of time, and establishing the reduction schedule with reference to the baseline. The energy efficiency ratio baseline and reduction schedule are established in a similar or the same manner for participating entities that have certain common characteristics, produce the same types of products, or provide the same types of services. In an exemplary embodiment, the baseline, reduction schedule and compliance requirements are specified by a regulatory entity. Energy efficiency requirements can also be set pursuant to other approaches not involving actual historical consumption, such setting the reduction schedule based on a best practices approach or model, or based on achieving a target level, such as a level of efficiency or energy consumption.

In another embodiment, the invention comprises establishing energy efficiency requirements in the form of one or more standards for energy efficiency, that if met would allow a participating entity to claim compliance with the particular standard achieved.

Energy efficiency credits can be issued prior to, during or after the subject compliance period. In an exemplary embodiment, the credits are issued prior to or during the compliance period free of charge to participating entities with reference to the reduction schedule based on a certain level of production. The number of credits issued would be that amount necessary to achieve the reduction schedule at an estimated level of production. Another embodiment involves requiring the participating entities to acquire the entire quantity of energy efficiency credits necessary to satisfy the reduction schedule for the actual level of production. Credits may be made available through periodic sales by an authorized issuer, including auction sales, or obtained from other participating entities via a trading platform, over-the-counter or from privately negotiated transactions. Yet a third alternative involves issuing only a portion of the energy efficiency credits necessary to meet the reduction schedule (with respect to a certain level of production), and requiring the participating entities to acquire all additional credits depending on production. Alternatively, energy efficiency credits can be issued to participating entities at the end of a compliance time period, only to the extent that the participating entity has reduced its energy efficiency ratio beyond the requirements of its reduction schedule.

The present invention further relates to a computer-based system for facilitating the trade of energy efficiency credits in the form of an energy financial instrument traded on an organized exchange. The trading platform can include or be connected with an internet-based auction platform that facilitates forward or reverse auctions for credits being issued by a regulator or administrator of the energy efficiency program, or by participating entities in the program. One or more computerized databases may be used to keep a record of information concerning participating entities, such as information regarding use of energy and corresponding production achieved in historical time periods, applicable reduction schedules (a series of energy efficiency ratios that must be achieved for certain time periods), forecasted energy use and production, current actual energy use and production, the number of energy efficiency credits owned, and means for determining the amount of credits needed by each certain participating entity in order to achieve the reduction schedule (based on a certain level of production).

The system and method includes having an administrator maintain a computerized database connected to a network, wherein the database includes accounts for each participating entity with information about that entity's energy efficiency ratio and underlying measures of energy use and production, increases and decreases in the measures of energy use and production, the number of energy efficiency credits held, and transactions related to energy efficiency credits. The participating entities provide the administrator with information about the actual measure of energy use and measure of production during each compliance time period, including supporting documents, so that an energy efficiency ratio can be calculated and compliance with the reduction schedule can be determined. The information could be ascertained from devices that measure the production or energy use by each participating entity, or from reviewing information provided by the entity. Information provided by an entity can be verified or spot-checked by an objective third party, and if there are discrepancies the energy efficiency ratio achieved by the entity for the subject compliance time period is recalculated and the entity is required to acquire more or less energy efficiency credits or adjust production to comply with the reduction schedule.

In some embodiments, methods for computing energy use and production include taking activity data and applying selectable activity units (factors) for converting the activity data to quantities of energy and/or production. The factors are based on the type of activity and equivalents. The factors are standard values that facilitate the consistent and reliable determination of values. For determination of an energy consumption value, a factor may be associated with certain characteristics such as the type of energy consuming activity, geographic location of the activity, type of fuel consumed, materials used, or goods, services or activity produced. In some embodiments, a database of factors is provided, and may be queried for certain characteristics by the user. Activity data can be obtained from the subject participating entity, or can be determined by objective measurements obtained using mechanical devices or made by independent third parties. Where energy efficiency credits are issued prior to the end of the compliance period based on a certain level of production, a preferred embodiment of the invention contemplates issuing additional energy efficiency credits to an entity when the actual measure of production is greater than the estimated measure of production used to determine the number of credits issued previously for the compliance time period, or taking previously issued energy efficiency credits from an entity when the actual measure of production is less than the measure of production determined for the compliance time period.

In a preferred embodiment, a number of certain types of environmental credits from a related or unrelated program, such as a greenhouse gas reduction program can be correlated as being equivalent to a number of energy efficiency credits, and used by a participant as a substitute for some or all of the energy efficiency credits when determining the participating entity's energy efficiency ratio and compliance with the reduction schedule.

The energy efficiency credits can be issued to participating entities pursuant to an auction held on an internet-accessible auction platform, or allocated to participating entities in amounts based on the participating entity's industry, quantity of production, type of product or service, mode of operation, adoption of energy efficient technology, type of facilities or other characteristics of the entity. Furthermore, the energy efficiency credits can be and preferably are issued with a vintage year that makes the credit usable for compliance only in certain years, including future years.

The energy efficiency credits can be represented by energy financial instruments that require the seller of the instrument to provide to a buyer a specified quantity of the credits by or on a certain date. The energy financial instrument is preferably a standardized spot, futures or option contract that facilitates the purchase and sale of energy efficiency credits. The financial instruments can be bought and sold in privately negotiated transactions, over-the-counter transactions or via a computerized internet accessible trading platform, including an auction platform. The inventive method contemplates allowing a party that is not subject to the energy efficiency requirements to buy and sell energy efficiency credits or financial instruments.

In a preferred embodiment, use of the internet-accessible exchange platform trading system is limited to participating entities that meet certain qualifications such as having become a member of an organization, being in a certain industry, having a certain level of sophistication, experience or training, having a certain level of financial resources or a party or arrangement in place that will come into play in the event of non-performance, having a record of energy consumption that is above a certain threshold, or meeting specified regulatory requirements. The invention contemplates that participating entities may own energy efficiency credits but may trade them on the trading platform through other participating entities that have met the qualifications to trade on the platform. Typically, the trading system is comprised of order-matching software operating on an internet-accessible platform comprised of computers connected to a network that is integrated with clearing and settlement processing, and a registry database comprised of one or more databases that includes records concerning transactions and holdings of energy efficiency credits, as well as information about source, nature and/or characteristics of the credits owned. This registry database may be the complete record of holdings and transactions of the participating entities, or be part of a network of trading systems and registries that together reflect all the transactions and holdings of the participating entities. In a preferred embodiment the registry database is automatically updated to reflect transactions made on the trading system, and is linked to the databases containing operational and compliance information for participating entities. In a preferred embodiment, the clearing and settlement process involves one or more third parties that guarantee the delivery of energy efficiency credits by the seller, payment for the energy efficiency credits by the buyer, or the obligations of both parties, and the trading and registry systems are communicatively connected to the auction platform.

The integrated system can also include an interface where participating entities or the administrator can input and access operational information such as that concerning energy consumption and production, and participating entities can view information about their respective energy efficiency ratio and corresponding shortage of energy efficiency credits required for compliance, or surplus energy efficiency credits that can be sold or banked. The operational information may be kept in a database that is the same as or separate from the records regarding energy efficiency credits transactions and holdings, but in the preferred embodiment the information is available through an integrated interface. The registry system can incorporate certain rules applicable to participating entities and their accounts, and can be used to limit one or more of (a) the number of energy efficiency credits that a participating entity can recognize in a time period, or (b) the number of energy efficiency credits that an entity can bank, buy or sell, or (c) the number of energy efficiency credits that an entity is required to buy in order to comply with the reduction schedule.

The requirement that a participating entity meet the reduction schedule includes calculating the energy efficiency ratio at the end of each compliance time period and removing or retiring the quantity of energy efficiency credits (based on the level of production) that are necessary to equal the value in the reduction schedule for the specified certain time period (true-up), with the energy efficiency credits that remain after true-up capable of being sold or banked for later use. Also, the energy efficiency ratio, reduction schedule and compliance with the reduction schedule can be determined with reference to the measure of energy use and measure of production attributable to one or more products manufactured or one or more services rendered by a participating entity, and further wherein business units of the entity and companies affiliated with the entity can be aggregated or disaggregated in order to achieve compliance with the reduction schedule.

Other embodiments of the invention include a computer system for carrying out at least the establishing, issuing, trading and recordkeeping steps of the method. The computer system comprises network linked computer components including processors, memory and displays. Also, a processor readable medium usable on the computer system is disclosed. This medium comprises instructions that when executed by the processor causes the processor to perform at least the establishing, issuing, trading and recordkeeping steps of the present method.

BRIEF DESCRIPTION OF THE DRAWINGS

FIG. 7 schematically illustrates an exemplary display of a graphical user interface that facilitates computations of energy use.

FIG. 8 is a table showing representative energy efficiency compliance calculations for a number of operational outcomes according to the instant invention.

DETAILED DESCRIPTION OF THE INVENTION

Figure 1:
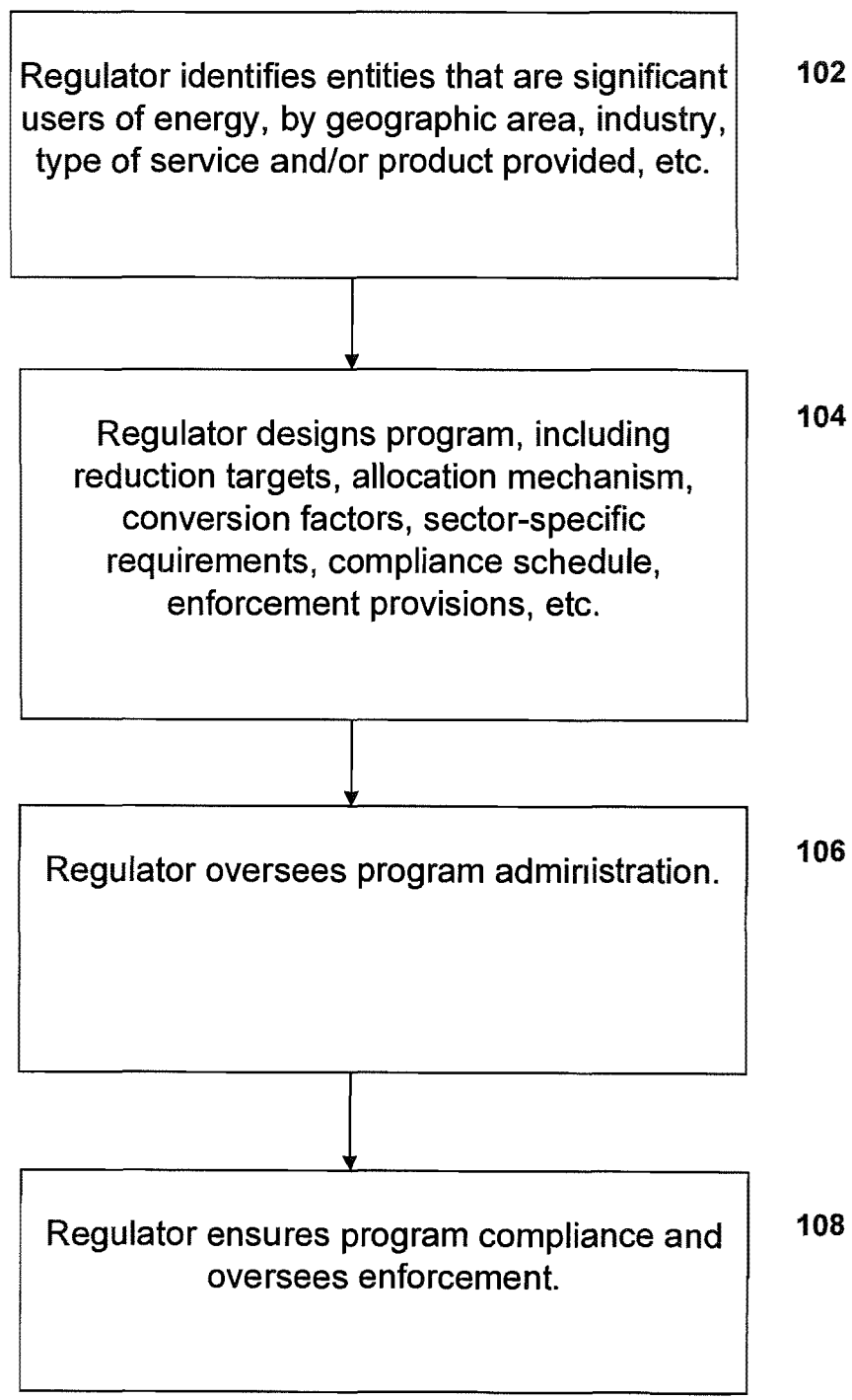
FIG. 1 is a flow diagram that illustrates the design and administration of the method of the invention.

The present invention relates to a system, method, and media for a computer-implemented system for establishing a measure of efficiency ("energy efficiency ratio") comprising a ratio of a measure of energy use to a measure of production; setting limits on the value of the energy efficiency ratio ("reduction schedule") for a series of compliance time periods; establishing a transferable credit ("energy efficiency credit") representing an amount of energy and a tradable instrument ("energy financial instrument") representing a number of energy efficiency credits; issuing a plurality of energy efficiency credits to participating entities or participants; establishing a computer-implemented trading system to facilitate the sale and purchase of energy efficiency credits or energy financial instruments; and requiring participating entities to comply with the reduction schedule. Except for the latter step, the method is preferably conducted by or implemented on a networked computer over the internet.

The systems and methods described herein are not limited to a hardware or software configuration; they can find applicability in many computing or processing environments. The systems and methods can be implemented in hardware or software, or in a combination of hardware and software. The systems and methods can be implemented in one or more computer programs, in which a computer program can be understood to comprise one or more processor-executable instructions. The computer programs can execute on one or more programmable processors, and can be stored on one or more storage media readable by the processor, comprising volatile and non-volatile memory and/or storage elements.

The computer programs can be implemented in high level procedural or object oriented programming language to communicate with a computer system. The computer programs can also be implemented in assembly or machine language. The language can be compiled or interpreted. In some embodiments, the computer programs can be implemented in one or more spreadsheets. For example, the computer programs can be implemented in one or more spreadsheets based on Microsoft EXCEL® and can include one or more macros and/or other functions.

The computer programs can be stored on a storage medium or a device (e.g., compact disk (CD), digital video disk (DVD), magnetic tape or disk, internal hard drive, external hard drive, random access memory (RAM), redundant array of independent disks (RAID), or removable memory device) that is readable by a general or special purpose programmable computer for configuring and operating the computer when the storage medium or device is read by the computer to perform the methods described herein.

Unless otherwise provided, references herein to memory can include one or more processor-readable and -accessible memory elements and/or components that can be internal to a processor-controlled device, external to a processor-controlled device, and/or can be accessed via a wired or wireless network using one or more communications protocols, and, unless otherwise provided, can be arranged to include one or more external and/or one or more internal memory devices, where such memory can be contiguous and/or partitioned based on the application.

Unless otherwise provided, references herein to a/the processor and a/the microprocessor can be understood to include one or more processors that can communicate in stand-alone and/or distributed environment(s) and can be configured to communicate via wired and/or wireless communications with one or more other processors, where such one or more processor can be configured to operate on one or more processor-controlled devices that can include similar or different devices. Use of such processor and microprocessor terminology can be understood to include a central processing unit, an arithmetic logic unit, an application-specific integrated circuit, and/or a task engine, with such examples provided for illustration and not limitation.

Unless otherwise provided, use of the articles "a" or "an" herein to modify a noun can be understood to include one or more than one of the modified noun.

Illustrative embodiments will now be described to provide an overall understanding of the disclosed systems and methods. One or more examples of the illustrative embodiments are shown in the drawings. Those of ordinary skill in the art will understand that the disclosed systems and methods can be adapted and modified to provide systems and methods for other applications, and that other additions and modifications can be made to the disclosed systems and methods without departing from the scope of the present disclosure. For example, features of the illustrative embodiments can be combined, separated, interchanged, and/or rearranged to generate other embodiments. Such modifications and variations are intended to be included within the scope of the present disclosure.

Tradable items in the context of the present invention include energy efficiency credits and energy financial instruments. Each tradable financial instrument typically represents a standardized quantity of energy efficiency credits, e.g., one hundred energy efficiency credits. In a preferred embodiment, energy efficiency credits and tradable financial instruments typically have vintage dates. For compliance purposes a participant can use energy efficiency credits with a vintage date that corresponds to or is earlier than the compliance period for which it is being used. In one embodiment of the invention, a party to a trade may deliver energy efficiency credits with vintages that correspond to or are earlier than the vintage date specified for the subject tradable financial instrument. An alternate embodiment of the invention may provide that a number of credits with certain characteristics from another program, such as a greenhouse gas cap and trade system could be delivered in place of energy efficiency credits to satisfy the delivery obligations. See Example 1 below, which is a representative contract specification for a standardized tradable energy financial instrument. Characteristics of the instrument can be varied to meet the needs of participants and the administrator.

In a preferred embodiment, the production of a participating entity or a participant is estimated for future compliance time periods. At some time prior to the commencement of the subject compliance period(s) the participant is allocated a number of energy efficiency credits necessary to achieve the energy efficiency ratios in the reduction schedule. The credits may be designated with vintages corresponding with the subject compliance periods. At the end of a compliance period the number of credits in the participant's account is adjusted if actual production is different than estimated. For example, if actual production for a compliance period is twenty percent more than estimated, twenty percent more energy efficiency credits will be issued to the account of the participant. If energy use is consistent with the energy efficiency ratio, no further credits will be needed.

At the end of each compliance period, participants that are covered by the energy efficiency requirements must demonstrate compliance. In a preferred embodiment, such a participant must turn over or retire a number of credits based on actual production, which will yield the energy efficiency ratio in the reduction schedule ("true-up"). If the participant used more energy for production than allowed by the energy efficiency ratio, the participant would be required to acquire additional credits to offset actual energy use. Correspondingly, if the participant's operations were more energy efficient than required, it would have more than enough energy efficiency credits to comply. Surplus credits could be sold or banked and used for future compliance periods.

In an alternative embodiment, energy efficiency credits are issued at the end of the compliance period (after actual production is known) in accordance with the energy efficiency ratio in the reduction schedule, and true-up would take place at some point in time thereafter. In this scenario no adjustment in credits (previously issued based on an estimate of production) would be necessary. The same true-up compliance obligation as above would apply, involving turning over a number of credits based on the energy efficiency ratio and actual production.

In a further alternative embodiment, the program could provide only for net true-up, where the energy efficiency ratio for a participant is determined at the end of the subject compliance period, and the participant is then required to purchase credits only to the extent it did not meet the required energy efficiency ratio (in the reduction schedule), or is issued credits only to the extent its actual energy efficiency ratio was better than required. For example, if the energy efficiency ratio calculated based on actual energy use and production yields a value higher than that specified in the reduction schedule, the participant would need to purchase a number of credits necessary to offset the excess energy use, thereby reducing its energy efficiency ratio. On the other hand, if the participant more than achieved its energy efficiency ratio, it would be issued a number of credits based on the difference between the reduction schedule energy efficiency schedule and the actual energy efficiency ratio achieved. Those additionally issued credits could be sold or banked.

In another embodiment, instead of receiving an allocation of 100% of the energy efficiency credits based on an estimate of production, the program might call for a participant to be issued no credits or only a percentage (or a fixed number) of the energy efficiency credits needed to achieve an energy efficiency ratio at the estimated production level. The number of credits allocated to a participant could be representative of an amount of energy that is a fraction of an overall energy amount that is a target for the particular sector or group of participants that are subject to the energy efficiency requirements. Such participants would then be required to purchase additionally needed credits through an auction, the trading platform, or privately negotiated transactions. Auctions might include original issue credits made available by the administrator of the program, credits owned by other participants, or a combination of both. Such credits could be purchased prior to or during the compliance time period based on estimates of energy use, production and efficiency, or all purchased after the compliance period was completed and all relevant information had been determined.

Regardless of the method employed, all deliveries of energy efficiency credits occur by making changes to registry accounts, wherein the number of credits in a transferor's account would be reduced and the number in a transferee's account would be increased. After the end of the compliance period, participants subject to energy efficiency requirements must turn over to the administrator (or regulator) a quantity of appropriate vintage credits based on its actual level of production and energy use, necessary to achieve the applicable energy efficiency ratio (true-up). The true-up process would be made in the registry and/or compliance accounts of the participant so that the subject credits are no longer useful for future compliance and cannot be sold. In a preferred embodiment, the credits would be removed from the participant's active account, and a corresponding entry would be made in an account to show credits surrendered for compliance.

Regarding the step of requiring participants to comply with the reduction schedule, when the manufacture of products is involved, one way to achieve the participant's compliance with the reduction schedule is by the participants improving the efficiency of production equipment that utilizes the energy. This can be done in a variety of way, such as by replacing old equipment with newer models, or by adding to or modifying the existing equipment to achieve greater output of products. This also can be achieved by reducing the downtime of the equipment so that fixed costs can be spread over greater periods of operation leading to more efficient production of a greater amount of products. The reduction schedule can also be achieved by acquiring energy efficiency credits to offset lack of efficiency improvements in such equipment, or through a combination of both methods.

The measure of energy use includes electricity and sources of energy that a participant consumes to produce products, provide services, generate revenues or conduct an activity. Fuel-use can include natural gas, propane, liquefied petroleum gas, kerosene, distillate fuel, residual fuel, anthracite, bituminous coal, sub-bituminous coal, lignite, peat, petroleum coke, gasoline, diesel, jet fuel, aviation gasoline, hydrocarbons, alcohols, hydrogen, renewable sources (such as wind, hydro, solar, biomass and geothermal) and purchased electricity derived from any of the foregoing or from nuclear or other materials.

The measure of energy use includes energy used in activities undertaken by a participant or for a participant, such as those that produce goods, provide services generate revenues, or conduct an activity where energy in some form is used. Accordingly, energy efficiency requirements could be applied to government entities, non-commercial groups, households, individuals, and businesses including office, retail, service, manufacturing, industrial, commercial and agricultural businesses.

The measure of energy use may exempt energy from certain specified sources, including renewable energy sources. These sources could include wind, solar, biomass, geothermal, or hydropower. These energy sources may be excluded from the consideration in the calculation of a participant's energy efficiency ratio since they are considered best-in-class technology or have negligible environmental consequences compared to energy production from fossil fuel sources such as coal, natural gas, or oil.

Selectable factors could also be used to calculate or adjust the participant's measure of energy use, whereby the applicable factor would be applied to the amount of each particular type of fuel used. This calculation or adjustment could occur either in conjunction with or independent of coexisting regulations for other pollutants. Since energy efficiency regulation is designed as an indirect method to address environmental problems (rather than as an end in and of itself), recognizing reductions for using desirable fuels is an important component for consideration. As an example, an industry standard factor could be established for each liter of gasoline fuel used in production, such that a participant would calculate energy use by multiplying liters of gasoline used by the factor. Ways in which factors could be determined could be via an industry average or through a standard that the regulator desired to be obtained. There are an unlimited number of methods by which this could be implemented such as making adjustments based on the grade of a specific fuel used within a type (for example, this could include the sulfur content of coal) or based on the technology used in turning the fuel into energy (for example, a two-stroke gasoline engine vs. a four-stroke gasoline engine).

The established energy efficiency credits and energy financial instruments represent a specified quantity of energy. Thus, although the fuel or means used to generate energy can vary, all must be converted into a standard unit of energy. Examples of this unit of energy could be British thermal units or joules. The importance of being capable of converting across multiple types of fuel use is that the choice of fuel is something entities are capable of controlling and the program can be structured to provide incentives for participants to use fuels that are less polluting.

The units of production can vary and could be designed to capture various objectives. In one embodiment, the unit of production could be the physical count of the particular good produced. For example, the unit of production for regulated automobile factories could be the number of cars produced. Alternatively, the unit of production could be expressed in revenue terms, resulting in for example, a reduction schedule and corresponding energy efficiency ratio being expressed in dollars of revenue per energy unit. In another embodiment, the unit of production could be the gross domestic product of the country or region where the regulated entity resides.

The measure of production (quantity of goods produced, services provided, financial revenues generated, or activity conducted) can be determined at a level that best achieves energy efficiency goals within the context of the particular situation. Measurement could be determined at an aggregate level, an individual participant entity level, or an operating division level, with or without regard for geographic limitations. For example, the rules could require that an individual company with multiple business units be required to measure production across all operating units to evaluate total energy efficiency, or to measure production of only selected energy-intensive operating divisions of the business entity. The production of multiple business entities under common ownership or control might be required to be aggregated. Businesses in similar industries or in distinct industries could be regulated together.

The participants comprise a plurality of businesses and other entities that consume energy in the production of goods or provision of services, generation of revenues or conduct of activities. Participants could be defined as those within a particular geographic area, an area with certain characteristics, particular business or industry, or to participants that consume a certain amount of energy or fossil fuel. Businesses that could be subject to such regulation could operate for either industrial or commercial objectives. Examples of sectors that could be regulated include electricity production, oil and gas production and distribution, heavy industrial production, government-owned facilities, commercial buildings, and manufacturing.

A baseline energy efficiency ratio may be determined for a participant from information about the participant's actual performance during a specified period of time ("baseline"), and the reduction schedule is determined with reference to the baseline. Participants within a program would all have their baseline defined in an analogous manner in order for a baseline to be established consistently amongst participants.

The energy efficiency ratio baseline and reduction schedule for participants that have certain common characteristics, produce the same types of products, or provide the same types of services are the same for all similar participants. The objective of creating similar standards for participants or entities with similar characteristics would ensure that the comparisons between regulated entities would be consistent and that the societal objectives would be attained. The program could be designed so that financial incentives would exist for regulated sources for undertaking energy efficiency improvements that could otherwise put them at a relative disadvantage to other competitors in the absence of the program.

The baseline, reduction schedule, and compliance requirements may be specified by a regulatory entity. The regulatory entity could consist of a government, a third-party, or an organization with structure and oversight over the participants. The regulatory entity would be addressed with the design, implementation and evaluation of rules within the program. The regulatory entity would oversee measurement, auditing, and compliance procedures. The regulatory entity could further be responsible for oversight of the marketplace and ensuring that the price is competitively-determined.

An administrator maintains a computerized database connected to a network, and the database includes accounts for each participant with information about the participant's energy efficiency ratio and underlying measures of energy use and production, increases and decreases in the measures of energy use and production, the number of energy efficiency credits held, and transactions related to energy efficiency credits.

The requirement to adhere to the reduction schedule is either undertaken voluntarily or is imposed by law. As an example, it could be possible that a country or region sets a general goal that it wishes to attain, and then entities with the specified region develop a voluntary plan by which they adhere to the targets. In another example, an organization could derive a voluntary reduction and trading scheme that entities could voluntarily join. As a third example, a regulatory entity could impose mandatory targets for participants under their jurisdiction by which these participants would be compelled to comply.

A number of environmental credits can be deemed to be equivalent to a number of energy efficiency credits and the former can be substituted for the latter in the determination of an energy efficiency ratio. As an example, a credit issued for a greenhouse gas mitigation or sequestration project could be used for compliance after the greenhouse gas mitigation units can be converted into energy efficiency equivalent units using standard conversion factors. One example would be use a general value of how much coal is burned to convert a certain amount of metric tons of carbon dioxide. The industry-standard value for the efficiency of coal could be used for a corresponding heat value, and this could be subsequently converted into energy efficiency units. The creating, valuation and trading of greenhouse gas credits, allowances and financial instruments are disclosed in U.S. Pat. No. 7,343,341, the entire content of which is expressly incorporated herein to the extent necessary to supplement this disclosure.

The energy efficiency credits are issued to participants pursuant to an auction held on an internet-accessible auction platform, or allocated to participants in amounts based on the participant's industry, quantity of production, type of product or service, mode of operation, adoption of energy efficient technology, type of facilities or other characteristics of the participant, or pursuant to a combination of auctions and allocation.

The energy efficiency credits can be issued with a vintage year that makes the credit usable for compliance only in certain years, including future years. Thus, the vintage year designation ensures that compliance instruments held by participants will have been subject to identical external conditions, including macroeconomic growth, tax policy, climate or weather fluctuations, or regulatory stringency. Holding credits, rather than selling them or using them for compliance in the vintage year, is a practice referred to as banking Permitting banking provides participants with compliance flexibility since it permits participants to plan for their compliance needs over a longer period of time, which enables them to be capable of adjusting to shocks and changes to external conditions.

The energy efficiency credit financial instrument is a standardized spot, futures, or option contract that facilitates the purchase and sale of energy efficiency credits in privately negotiated transactions, over-the-counter transactions or via a computerized exchange platform. The energy efficiency credit financial instrument would be analogous to a standard commodity contract currently traded on commodity exchanges or in over-the-counter transactions.

The energy efficiency credits can be issued to participants in advance of the subject compliance time period(s) based on a determined or estimated level of production, with reference to the reduction schedule. Issuing the energy efficiency credits in advance provides the participants with sufficient advance notice such so that they can plan compliance and efficiency improvements based on the relative costs between purchasing energy efficiency credits and making improvements in energy efficiency. This gives participants opportunities to evaluate various possibilities as both of these costs fluctuate over time. This further allows participants to have the opportunity to correctly measure and monitor their level of energy efficiency reductions. The number of energy efficiency credits issued (in advance) may need to be supplemented if actual production in the compliance period is greater than anticipated, or returned if actual production is less than anticipated. The energy efficiency credits can also be issued during or after the compliance period. If they are issued after the compliance period, one embodiment of the invention provides for issuing the net number of credits that would remain after retiring credits in accordance with the reduction schedule.

The trading system is usable by participants that meet certain requirements. Examples include being a member of an organization, being in a certain industry, having a certain level of financial resources, or having a record of energy consumption that is above a certain threshold. The trading system could be designed in this fashion to achieve any combination of the following objectives: that credit risk in executing trades is minimized enabling the traders to execute trades with counterparties based simply on a mutually understood and agreed-upon framework, and/or ensuring that trading does not involve parties with negligible resources.

The trading system is comprised of order-matching software operating on an internet-accessible platform comprised of computers connected to a network. This can be integrated with settlement processing, a registry system that imparts certain program rules and maintains records reflecting transactions and ownership of energy efficiency credits, and an auction platform. Additionally, the trading system can include a clearing system whereby one or more third parties guarantee performance of one or both of the trading parties.

The integrated system also includes interfaces where participants and the administrator can input and access certain information. This provides functionality wherein participants or the administrator can input information about energy consumption, energy activities and production. Participants can receive information about their respective energy efficiency ratio and corresponding shortage of energy efficiency credits for compliance, or surplus energy efficiency credits that can be sold or banked. In one embodiment of the invention, the participants are can enter information into the system to estimate energy efficiency at any given time (and the corresponding need for or surplus of credits), but cannot enter definitive energy use or production values for compliance purposes. In this embodiment, definitive values can only be entered or modified by the administrator. In any embodiment, the system could be set to allow the general public to have view-only access to limited energy efficiency information about particular participants or a composite of participants.

The registry system applies certain rules to participant accounts. As an example, certain industries or sectors could be subject to different regulations, and hence could be subject to different quantification methodologies or reduction schedules. Sales and/or purchasing limits, or purchase requirements could also vary by industry. Introducing this flexibility permits the program to achieve multiple societal objectives.

Limits on the number of energy efficiency credits derived from a compliance time period that a participant could bank, be required to buy in order to comply with the reduction schedule, or be allowed to sell is also important to ensure that the market price for credits is competitively determined. By implementing this, no individual participant is permitted to sell or buy a sufficiently large amount of energy efficiency credits so that the price faced by others may be suboptimal.

Participants may be required to provide an administrator with information about the quantity of energy use and production during a compliance time period, including supporting documents, or these quantities could be verified or determined by an administrator or a third party. The system may also allow for direct measurement of quantities of energy use or production of a participant using certain devices. The administrator can maintain records on file for program-wide reporting. This reporting may or may not be publicly available. Participants may or may not have the option of voluntarily disclosing their ability to achieve the compliance targets for the program. The information can be evaluated by an objective third party auditor, and if there are discrepancies, the energy efficiency ratio for the subject compliance time period is recalculated and the participant is required to obtain energy efficiency credits to comply with an adjusted energy efficiency ratio. The objective of third party audit is to maintain the integrity of the program, and to ensure that environmental objectives of the program are achieved and maintained.

The following examples demonstrate hypothetical compliance scenarios that could arise under the invention. Suppose that an electricity-producing entity burns a certain amount of coal to generate one megawatt hour of electricity and from that energy earns an amount of revenue. The energy efficiency ratio could then be determined as the megawatt hours of electricity per unit of revenue. Rules for the program may specify that the quantity of energy is simply the actual amount generated by the burning of the coal. Alternatively or in addition, it could be specified that the amount of energy be determined according to a prescribed formula based on the amount of coal burned. If, for example, a different entity burned a certain amount of natural gas to generate one megawatt hour of electricity to earn a corresponding amount of revenue, the energy component could be the actual energy generated or an amount determined based on a prescribed algorithm applicable to the burning of natural gas.

The reduction schedule for these entities would be a series of energy efficiency ratio values, each value corresponding to a particular compliance period. In general, the values would become smaller in each subsequent compliance period, but it is possible that values could be set to remain constant or increase depending on the circumstances and objectives of the program. There are three ways for entities to effectively lower their energy efficiency ratios. An entity could increase production (relative to energy use), decrease energy use (relative to production), or acquire energy efficiency credits to offset actual energy use. So, for example, a manufacturing facility that operates its machinery at less than capacity might be able to run the same machinery at capacity and produce more, thereby increasing production relative to energy use. The same entity may be able to achieve the same production by using fewer machines running at capacity, thereby reducing energy use relative to production. Finally, if the entity finds that it is unable or undesirable to alter its operations for whatever reason, it can simply acquire energy efficiency credits to offset actual energy use. Each of these approaches alone or used in combination will effectively reduce the entity's energy efficiency ratio, allowing it to achieve its reduction schedule.

The requirement that a participant meet the reduction schedule includes calculating the energy efficiency ratio at the end of a compliance time period and removing or retiring the quantity of energy efficiency credits that are necessary to equal the value in the reduction schedule for the subject period. Energy efficiency credits that remain can be sold, or banked for later sale or use in complying with the reduction schedule in a subsequent compliance period. The advantage of allowing banking is that it provides the subject entities with flexibility. A fixed cap of energy efficiency with no ability to bank credits can lead to unnecessary volatility in the marginal cost of compliance, and since these costs can vary both within and between years, banking affords entities the ability to make further cuts in energy efficiency when operational compliance costs are low and use these surplus credits when operational compliance costs are higher. Permitting banking has the effect of reducing the volatility associated with compliance costs over time.

The baseline, energy efficiency ratio, reduction schedule and compliance with the reduction schedule are determined with reference to the measure of energy use and measure of production by one or more business units of a participant. The rules implemented as part of the system may require that business units of a participant and companies affiliated with a participant can or must be aggregated or disaggregated, and compliance with a reduction schedule achieved accordingly.

Participants that achieve an energy efficiency ratio beyond what is required can sell unused energy efficiency credits and reinvest the resulting money to further improve efficiency. The ability to sell unused credits provides a financial incentive to implement energy efficiency measures, and in a real sense can be seen to reduce the cost of improvements in an analysis of whether the cost of improvements is justified by the reduction in energy expense. Accordingly, operational improvements that increase energy efficiency have financial implications that can be viewed as subsidizing the cost of current or future improvements. One of the objectives of this type of regulation is that it provides entities with the impetus of evaluating where their own reductions in energy usage can arise most efficiently. This type of program can lead to lower costs than alternatives, such as where specific types of capital investment projects would be required of all participants by a regulator. An alternative approach such as this may not be as cost-effective as encouraging energy efficiency through a program involving the instant invention since the effectiveness of a particular capital investment project could vary considerably by firm, and regulators would not know this information better than the firms themselves would know it.

Turning now to the drawings, FIG. 1 shows an example of a logical flow diagram that demonstrates the flexibility that can be imparted in designing and administering the program. For example, at step 102, a regulator identifies entities within a given geographic region by energy generation sector that is identified as a region and sector for which energy efficiency improvements are desired. At step 104, the regulator designs the program architecture. This includes identifying the reduction targets, allowance allocation mechanism, conversion factors, sector-specific requirements, compliance schedule, enforcement provisions, and marketplace oversight. At step 106, the regulator oversees the program administration. This includes educating participants about program requirements, ensuring that the marketplace is functioning according to program rules, and resolving any matters associated with the program. At step 108, the regulator ensures program compliance and oversees enforcement.

Figure 2:
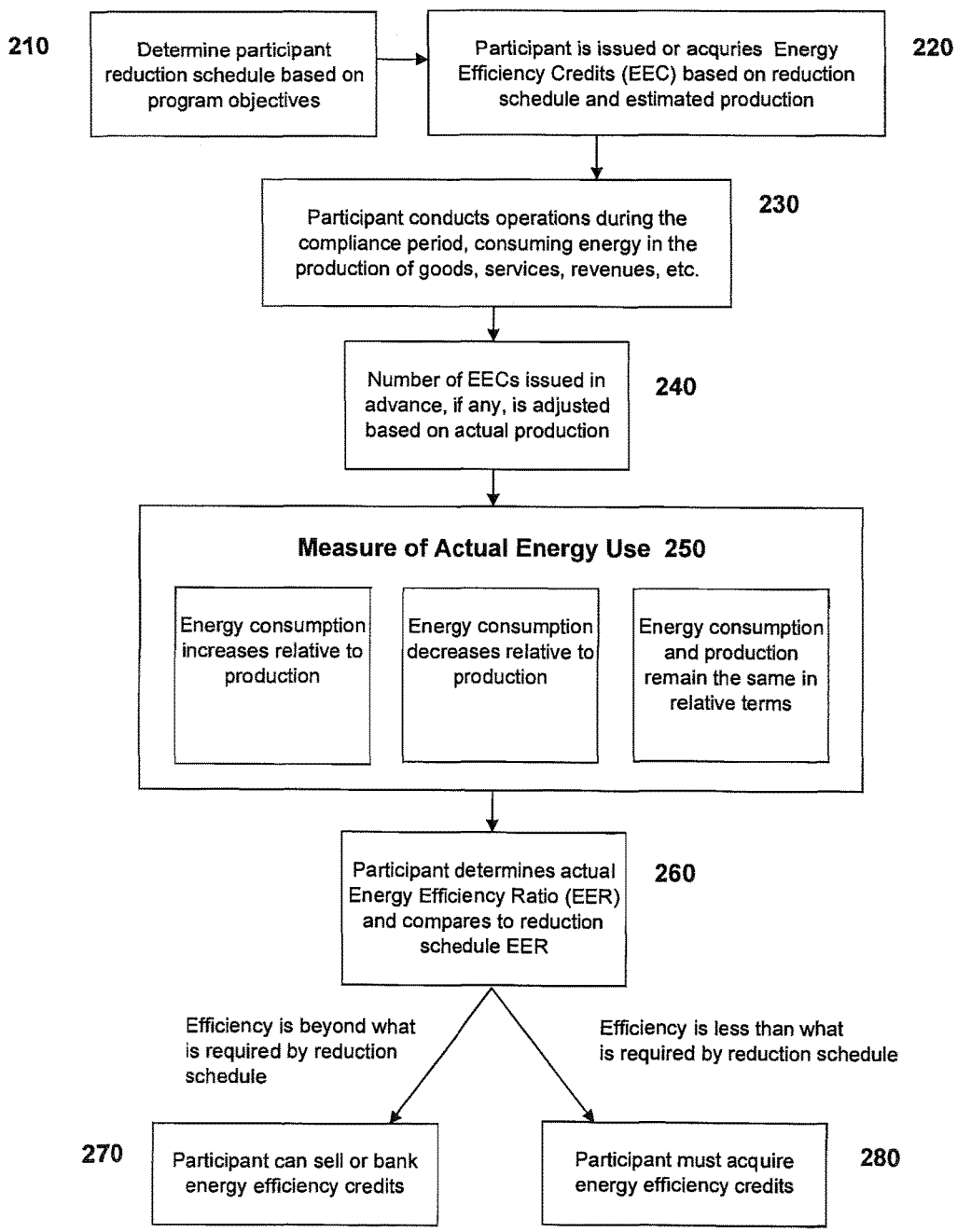
FIG. 2 is a flow diagram that illustrates how a regulated entity participates in the methods of the invention.

FIG. 2 shows an example of a logical flow diagram that demonstrates how a regulated entity would participate in such a program. At step 210, a reduction schedule for the participant is based on program rules, structured to achieve an objective such as efficiently distributing energy generation capacity, achieving desired emission reductions, achieving a level of production per energy unit, etc. A reduction schedule could be imposed that requires improvements relative to the participant's actual historical energy efficiency (from a baseline determined from a prior period), relative to a best practices level of energy efficiency for a particular type of production, or some other approach. At step 220, in this example the participant is issued or begins to acquire energy efficiency credits base on the applicable reduction schedule value and estimated production. The program might provide that each participant will receive an initial allocation of all credits necessary to achieve the reduction schedule value for the estimated level of production (without cost to the participant). The program might provide that some percentage or none of the credits will be issued without cost, in which case a participant will need to acquire any credits that are necessary to achieve the energy efficiency ratio in the reduction schedule. At step 230, the participant conducts its operations during the compliance period; actual energy use and production are established. At step 240, the number of energy efficiency credits issued based on actual production, if any, is adjusted based on actual production. If production is greater, the participant receives proportionately more credits, and if production is less the allocation of credits is reduced. The adjustment is made by increasing or decreasing the number of credits in a participants registry account. If there is no initial allocation of credits, increases and decreases in production will presumably lead to corresponding increases and decreases in energy use, and the participant will be responsible for the adjusted number of energy efficiency credits in accordance with the reduction schedule and program rules. At step 250, actual energy use is determined in accordance with the rules of the program. See FIG. 7 for a calculation methodology. At step 260, an energy efficiency ratio is calculated based on actual energy use and production, and it is compared with the value in the reduction schedule. The market participant is then able to evaluate if their energy efficiency ratio is in compliance with their energy efficiency reduction schedule required by the program. If there was 100% allocation of credits pursuant to the reduction schedule and the participant's operations were more efficient than required by the reduction schedule, the participant will have excess energy efficiency credits after compliance true-up 270; conversely, if the participant's operations were not as efficient as required by the reduction schedule, the participant will be required to acquire additional credits to achieve the energy efficiency value in the reduction schedule 280.

If the participant burns fuel in the generation of its own energy (for example, burning natural gas instead of buying electricity), the participant will have control of the means by which it turns fuel into energy and would be held accountable for the efficiency of this process as well. The program might specify a reduction schedule for the amount of fuel consumed to the amount of energy produced, as well as the amount of energy consumed to the amount of steel produced, or an overall value for the amount of fuel consumed to the amount of steel produced. If the program specifies energy efficiency ratios for energy generation as well as energy use, the process in FIG. 2 would be applicable to each.

Figure 3:
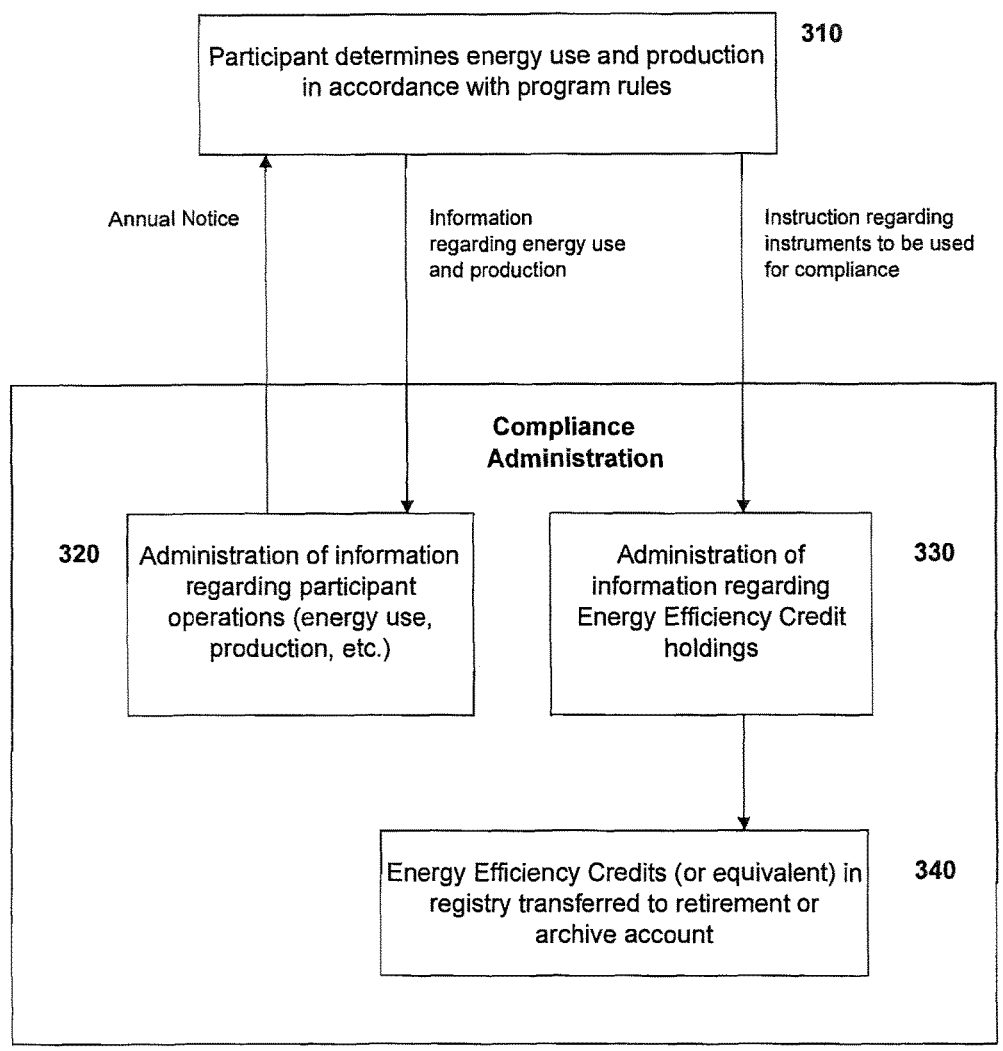
FIG. 3 is a flow diagram that illustrates how the marketplace would function for participating entities in the proposed methods of the invention.

FIG. 3 illustrates a flow diagram of an exemplary annual compliance true-up process utilized in the system 400 described with reference to FIG. 4 and/or the system described with reference to FIG. 6. The true-up process can involve the following operations, additional operations, or fewer operations depending on the embodiment. Participants of the market apply facility monitoring rules to operations data in an operation 310. Relevant operations data may be obtained and/or converted for use in the program in accordance with program rules as set forth in FIG. 7. The operations data is communicated to the market and stored in a database in an operation 320.

In accordance with true-up procedures, participants are provided with annual compliance notice indicating the required quantity of energy efficiency credit (or equivalent instrument) to be surrendered. Subsequent to each compliance year, each participant must surrender any combination of energy efficiency credits (or equivalent instruments), based on energy use and production data from that participant's included facilities during the compliance year. Compliance through the surrender of equivalent instruments allows the participants to devote resources to their highest impact-per-dollar activity (e.g., improving energy efficiency, reducing emissions, etc).

The administrator of the registry designates energy efficiency credits (or equivalent instruments) for compliance use in accordance with instructions from Participant 330. This may include consideration of instrument types and vintages to be retired in fulfillment of compliance commitment. On the compliance date, the registry account(s) of the participant are adjusted to surrender the designated credits or other instruments, which may be done by moving them to a retired or surrendered account, or other means of deactivating them in an operation 840. As such, participants "true-up" or account for the energy efficiency credits needed for compliance according to the reduction schedule.

Figure 4:
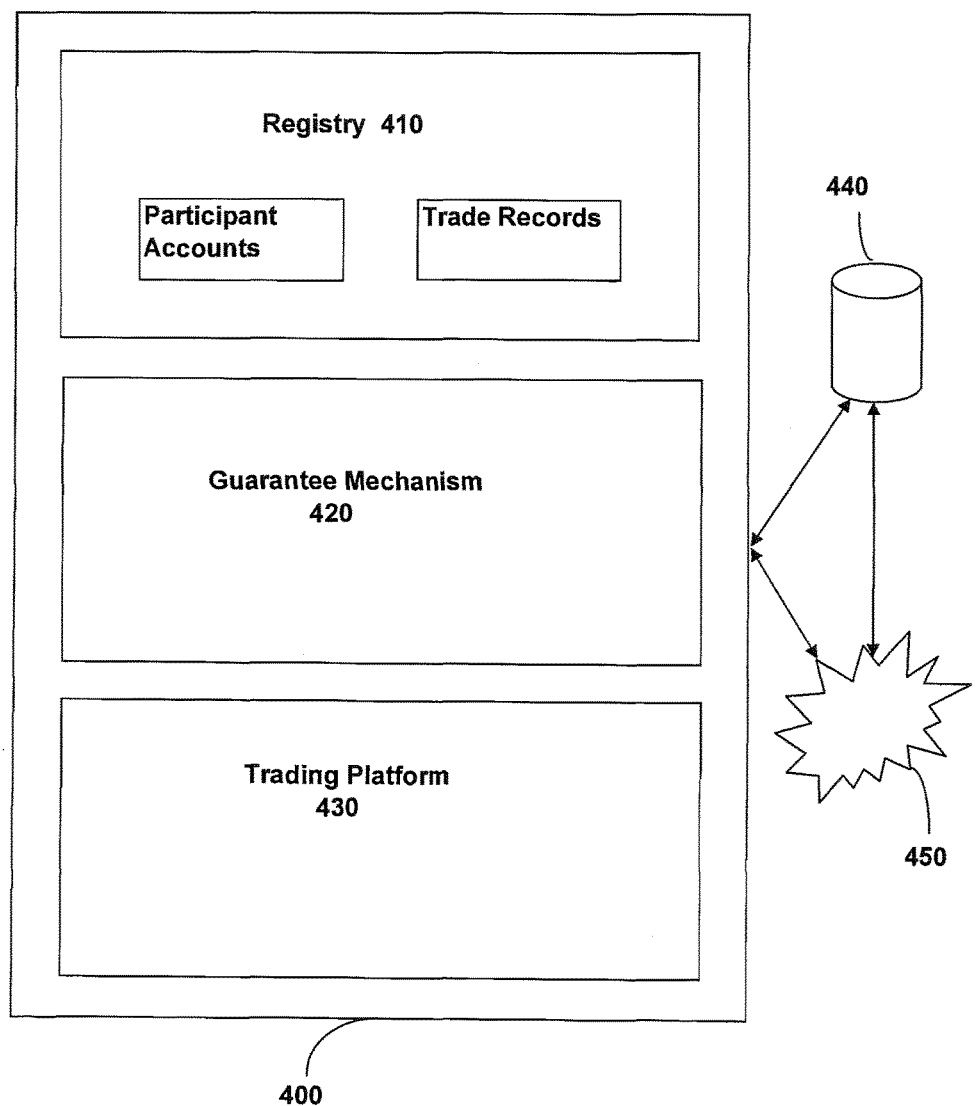
FIG. 4 is a block diagram of a trading system in accordance with an exemplary embodiment of the present invention.

FIG. 4 illustrates a diagrammatic representation of a trading system 400. The system 400 can include a registry 410, a guarantee mechanism 420, and a trading host or platform 430. The system 400 can be coupled to a network 450, such as the Internet or any other public or private connections of computing devices. The system 400 can be communicatively coupled to one or more databases 440 either directly or via the network 450, which databases contain among other information records about participants' past, present and estimated future energy use and production. The registry database may be the complete record of holdings and transactions of participants, or be part of a network of trading systems and registries that together reflect all the transactions and holdings of participants. In a preferred embodiment the registry database is automatically updated to reflect transactions made on the trading system, and is linked to the databases containing operational and compliance information for participants.

The registry 410 serves as the official record of energy efficiency credit holdings of each participant in the market facilitated by the system 400. Trades become officially acknowledged for compliance purposes only when they are transferred across accounts in the registry 410. The holdings of the registry 410 can be energy efficiency credits or energy financial instruments. Credits may include those initially issued pursuant a reduction schedule and those bought through an auction. The program may or may not include credits issued for specified energy efficiency activities such as generating energy from renewable fuels. Each energy efficiency credit is recognized as equivalent when surrendered for compliance (subject to certain constraints described below). Credits may be used in compliance in their designated vintage year or in later years. These equivalents facilitate standardized trades.

Participants include the entities that must comply with the energy efficiency requirements as well as parties who have no compliance obligation, but may own and buy and sell energy efficiency credits. If the program provides for award of energy efficiency credits for specified energy efficiency activities, each recipient will have a registry account and may be allowed to trade on the trading platform if they meet certain requirements.

In an exemplary embodiment, the registry 410 is designed to have secure Internet access by participants to their own accounts. The registry 410 may be configured to provide access of accounts by the public, but this access would be on a view-only basis. Preferably, the registry 410 is configured with the ability to interface with registries in other markets. The registry 410 is linked to the trading platform 430 and financial guarantee mechanism 420. The combination of these three components provides a clearinghouse system.

The guarantee mechanism 420 enhances market performance in several ways. The guarantee mechanism 420 ensures that those who conduct sales on the trading platform 430 receive next-day payment even if the buyer fails to execute the payment process. This mechanism allows for anonymous trading by eliminating the need to address the creditworthiness of buyers. Non-payment risk is eliminated, thus removing a transaction cost. This feature allows liquidity providers to participate in the market (including "market makers"), who can stand ready to promptly buy and sell. The presence of standing buyers and sellers increases trading activity, which improves the economic efficiency of the price discovery process. In addition, the ability to trade anonymously allows participants to post bids and offers and execute trades without revealing their trading strategies. The guarantee mechanism 16, eliminates the risk that a buyer may fail to make payment.

The trading platform 430 is an electronic mechanism for hosting market trading. The trading platform 430 provides participants with a central location that facilitates trading, and publicly reveals price information. The trading platform 430 reduces the cost of locating trading counter parties and finalizing trades, an important benefit in a new market. An auction platform may be integrated with or independent of the trading platform. In a preferred embodiment the auction platform is connected to the registry either directly or through the trading platform.

Figure 5:
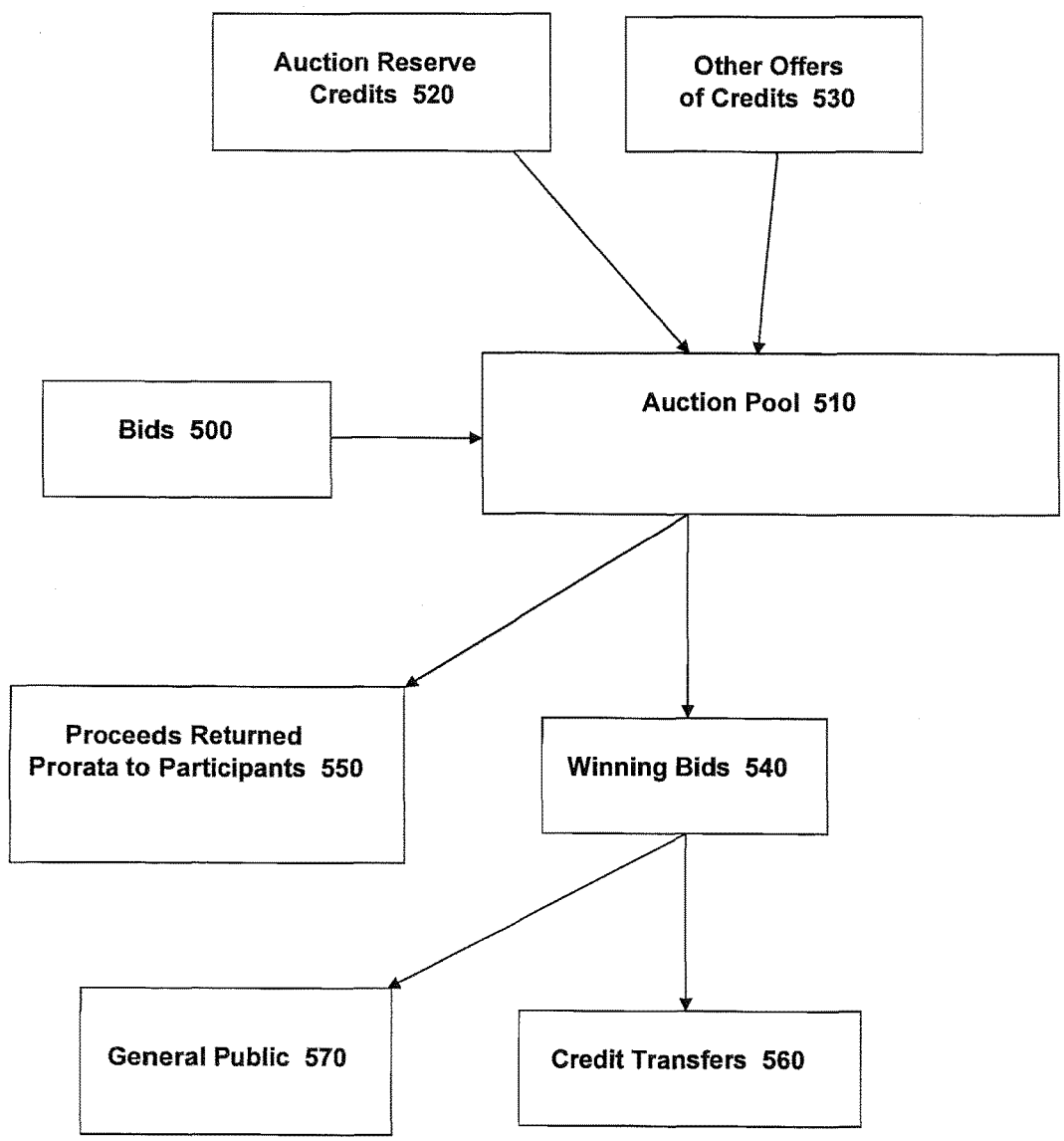
FIG. 5 is a diagrammatic representation of auction functionality within the system of FIG. 4 in accordance with an exemplary embodiment.

FIG. 5 illustrates an exemplary auction platform that can be used to conduct a forward auction in connection with using system 400 described with reference to FIG. 4. Alternatively or in addition, auctions can be held intermittently throughout a year. In an exemplary embodiment, the auction operates by providing energy efficiency credits offered by the program administrator or by one or more participants. The auction platform can be used to solicit bids from potential buyers who bid for a number of credits for a price (forward auction), and also to solicit bids from potential sellers who bid to supply a number of credits for a particular price (reverse auction). Energy efficiency credits that are listed for sale in a forward auction could be comprised as an auction pool 510. The auction facility is preferably hosted on an Internet-accessible platform so that authorized bidders can post bids 500. The auction pool 510 can receive energy efficiency credits from an auction reserve (held back during initial issuance) 520 and other offers 530 from participants that have credits to sell. Winning bids 540 are determined at the end of the auction, in terms of the number and price of credits that winning bidders will receive. Auction results including price and number of credits are made available to the general public 570. If there is more than one party seeking bids, proceeds returned pro rata 550. Winning bids 540 result in transfers of credits 560 between accounts in the registry 410 described with reference to FIG. 4.

Advantageously, auctions of energy efficiency credits provide an orderly mechanism for assisting the market. By publicly revealing prices, the auctions provide critical information to participants. Prices help participants formulate reasonable private trading terms and, importantly, provide signals indicating which internal energy efficiency actions are economically logical and which actions are best performed by other participants who face lower operational costs.

The system 400 preferably conducts periodic auctions of energy efficiency credits for the purpose of revealing market prices, encouraging trade, and expanding market participation. In an exemplary embodiment, a single-clearing price auction is performed. Alternatively, a discriminating price auction is used. By way of example, a single clearing price auction is understood to be an auction where all buyers pay the lowest price of all accepted bids. In contrast, a discriminating price auction is understood to be an auction where the successful buyers pay the price they bid regardless of other accepted bid prices. As such, it is possible to have different accepted prices in the same auction.

Figure 6:
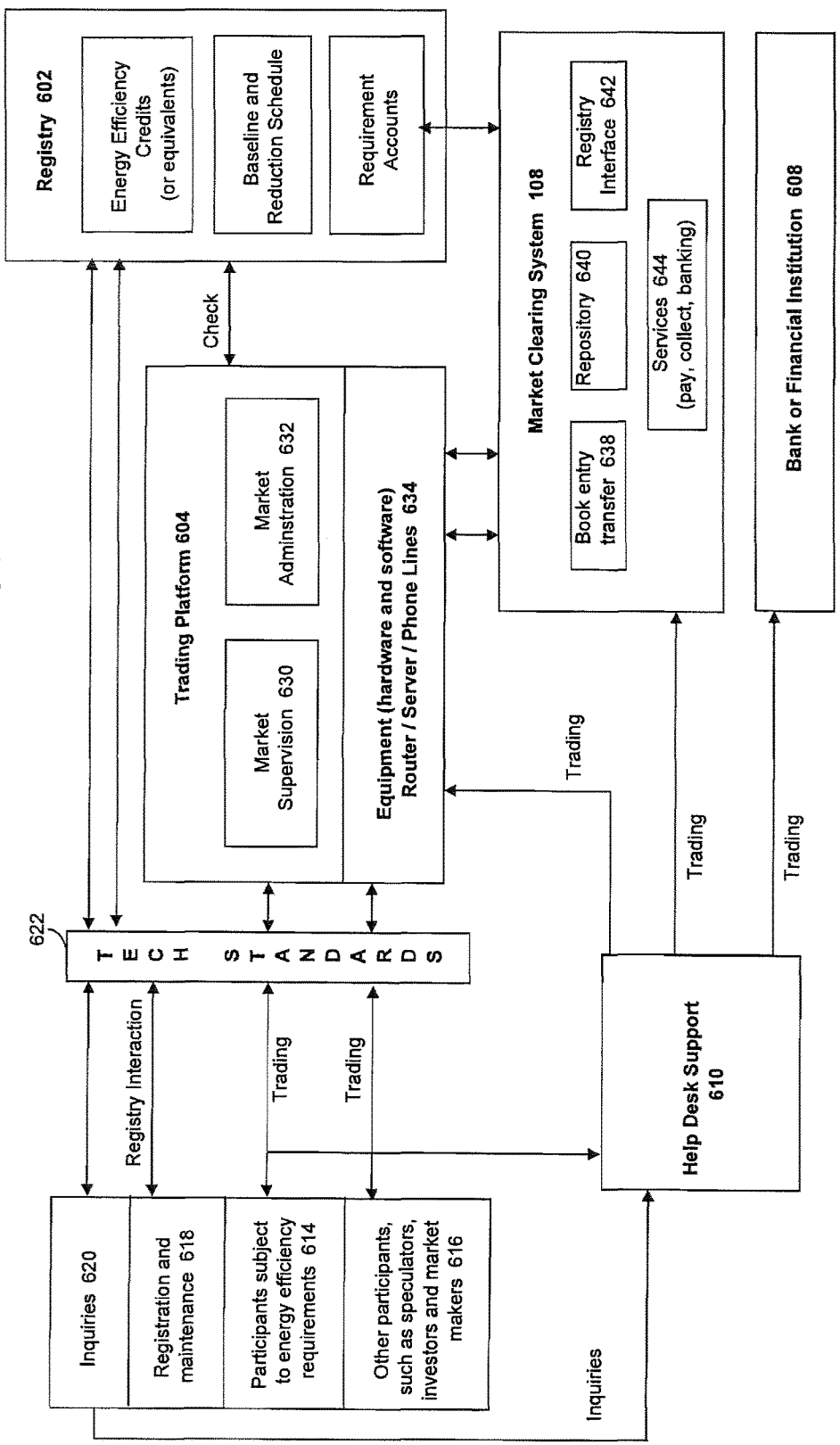
FIG. 6 is a block diagram of a trading system in accordance with another exemplary embodiment.

FIG. 6 further illustrates a trading system such as that shown in FIG. 4. The system in FIG. 6 can include a registry 602, a trading platform 604, a clearing component 606, a financial institution 608, a help desk and a help desk support component 610. In general, participants subject to reduction requirements 614 and other participants 616 interact with the trading platform 604 to engage in buying and selling energy efficiency credits, energy financial instruments and equivalents. For registration/maintenance 618 and general inquiries 620, the participants 614 and 616 interact directly with the registry 602. In either case, communication is done by way of technology standards 622. The technology standards 622 can include internet protocol standards and other technology-specific standards that facilitate communication by participants 614 and 616.

The registry 602 can include information regarding energy efficiency credits in absolute terms or in terms of a number of energy financial instruments as well as information regarding equivalents, such as carbon credits. The registry can also include information about a participant's baseline and reduction schedule. The registry 602 can be implemented using a database and computer software. The registry 602 can also include an account reflecting a number of energy efficiency credits previously used in compliance (true-up), and a number of credits designated for use in compliance.

The trading platform 604 provides participants 614 and 616 with a structure that enables the trading of energy efficiency credits owned by any other participant. The trading platform 604 can be implemented as a software program providing a user interface that enables the execution of various functions. The trading platform 604 can include market supervision 630, market administration 632, and equipment 634. The equipment 634 can include hardware and/or software, such as, routers, servers, phone lines, and the like. The market administration 632 allows the exchange to manage, intervene, and control accounts and make adjustments to accounts. Market supervision 630 facilitates the oversight of trading done using the trading platform 604 for adherence to system rules.

The trading platform 604 is coupled to the registry 602 to obtain and communicate information, such as, account information and trading records. The trading platform 604 also interacts with the clearing component 606 in the carrying out of trades performed by participants 614 and participants 616 on the trading platform 604. The clearing component 606 can include a book entry transfer 638 that constitutes the official mechanism by which delivery of tradable energy financial instruments occur, a repository 640, a registry interface 642, and a collection component 644. The financial institution 608 provides for settlement of trades and may provide a mechanism by which financial performance is guaranteed.

The help desk 610 provides trading support for participants 614 and participants 616 for trades using the trading platform 604. The help desk support component 612 assists in customer inquiries that are made directly to the system without going through the trading platform 604, which may be provided and maintained by a third party.

The market (as embodied in FIGS. 4 and 6) has been designed with a view to standardized contracts used in the trading of energy financial instruments. Uniform and fully fungible energy financial instruments allow for easy transfer and flexibility among participants. Uniformity reduces transaction costs, increases predictability and enhances market liquidity. Such features are a few of the improvements relative to the heterogeneous and high transaction costs associated with practices currently used in the off-exchange transactions.

Each participant of the market managed by the system described with reference to FIG. 4 or the system described with reference to FIG. 6 (hereinafter collectively referred to as the "market") has energy efficiency baseline, which can be its energy efficiency ratio determined for a particular period of time, the average of its energy efficiency ratio during certain previous periods, such as such as 2005 through 2008, a number that is a blend of actual energy efficiency for a number of participants, or a target value based on a model or other objective considerations.

Figure 7:
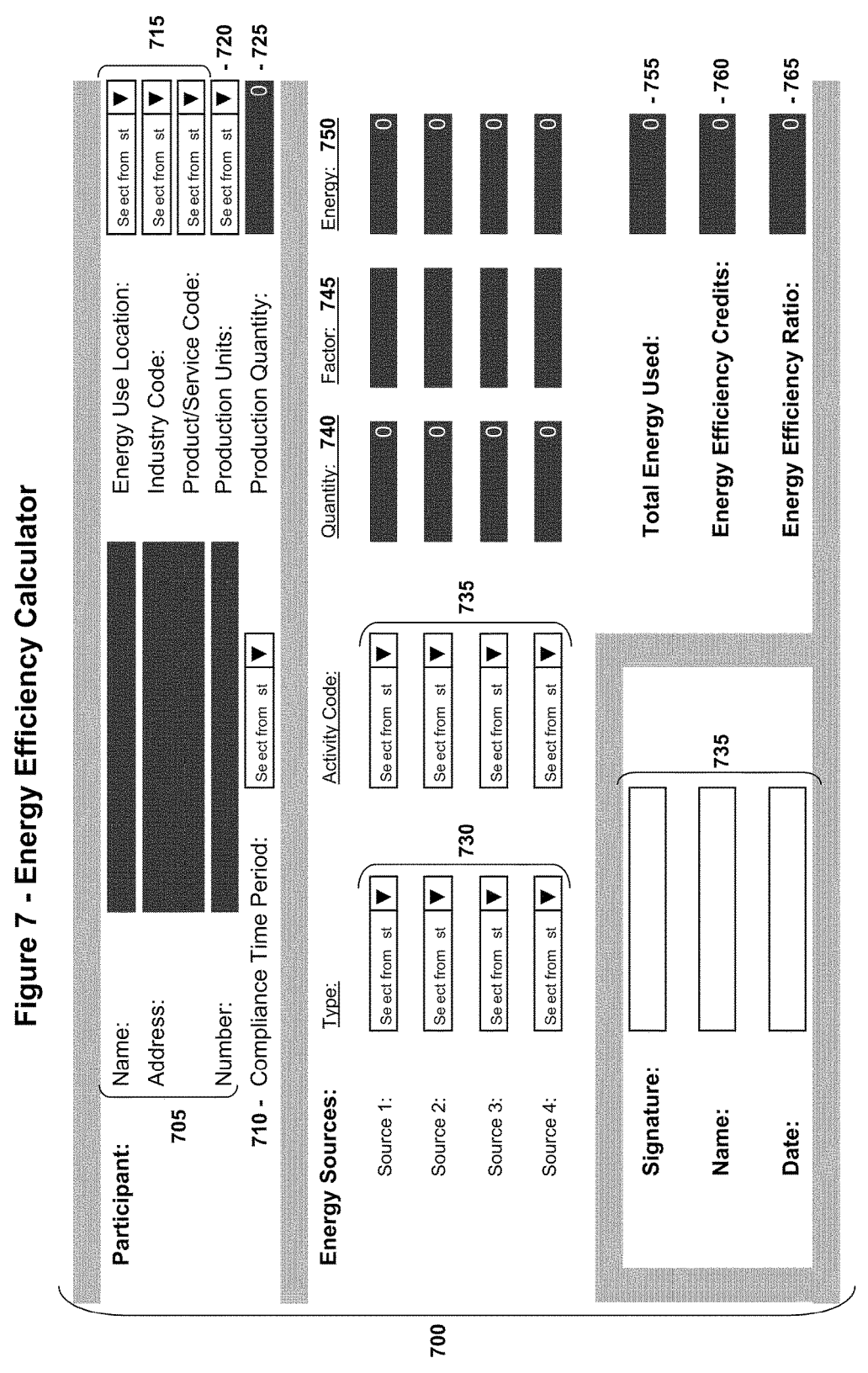

FIG. 7 represents a computer screen display 700 for means of calculating energy use, and with production input, calculates an energy efficiency ratio. FIG. 7 (referred to herein as the calculator window) includes a series of fields to identify the participant 705, including name, address, and participant ID number. Compliance Time Period is a drop down menu 710, including selectable choices corresponding with the compliance periods that are specified by the rules of the program. The calculator window further includes certain selectable information that is used to classify the participant 715 (such as geographic location of the activity, industry, and product or service) and will determine the applicable rules (activities subject to energy efficiency, factors to be applied in determining energy usage, etc.) and the nature and format of input required. Other participants with the similar characteristics will be subject to the same rules. Based on selections made by the participant, the system will classify the participant, and certain relevant units of production will be selectable 720, and the participant will then be able to enter a production quantity in the units selected 725.

For each activity (manufacture, storage, transportation, etc.) 730 applicable to the good or service selected, the participant further selects a source of energy, including whether it was generated by the participant or acquire elsewhere (natural gas—consumed, electricity—acquired, etc.) 735. Units of measure in the "Quantity" field 740 are determined by the fuel type selected. After input of the quantity, the calculator window determines and applies a factor 745 and renders an energy value 750. The sum of all the energy amounts from all sources specified continually updated at field 755. Field 760 calculates and shows the number of energy efficiency credits that are equivalent to the total energy used 755 and the resulting energy efficiency ratio 765 based on the specified production 725. At step 770, the authorized participant's representative then enter a mark or other input representing his signature, and indicate his name. The date the calculator window was completed will be determined and presented automatically.

Fields could be added or a separate interface could be added to show the calculation of a participant's baseline and applicable reduction schedule, make a comparison of the actual energy efficiency ratio to the reduction schedule value, and determine discrepancies and the resulting surplus or deficit of energy efficiency credits. In a preferred embodiment, some of these additional fields would be populated from the input and results of the calculator window 700, and from the registry database referred to at 410 in FIG. 4 and/or 602 in FIG. 6. See FIG. 8 for an example of such additional fields and calculations.

FIG. 8 shows a representative baseline calculation and reduction schedule, and eleven different operational scenarios for a participant for year 2016 (the first of five compliance years). The information and calculations for any one of the operational scenarios would be similar to the information and calculations referred to at the end of the discussion of FIG. 7 regarding incorporating additional fields or an additional interface to determining compliance obligations. In this example, the baseline energy efficiency ratio value calculation is simply the ratio of energy use to production in the specified baseline year, here 2010. The reduction schedule states the percent decreases in the energy efficiency ratio that are required each year, and the resulting value based on the baseline previously calculated. For this 2016 compliance year, the energy efficiency ratio must be reduced by 2% of the baseline (see reduction schedule at top in center). Accordingly, the participant must achieve an energy efficiency ratio of 0.882 (i.e., a 2% reduction or 98% of the 0.9 energy efficiency baseline). This can be done by reducing energy use relative to production or by acquiring credits to offset actual energy use.

As is typical, the compliance period is a calendar year, and data represents annual total values. For simplicity, in the example program 1 energy efficiency credit is made equal to 1 unit of energy. Also for simplicity, the baseline production value is used as the estimated value for initial allocation. This example involves allocation of 100% of the number of energy efficiency credits provided by the reduction schedule. Values are rounded to 3 decimal places. Based on estimated 20 units of production for 2016, the participant is issued 17.64 energy efficiency credits representing 17.64 units of energy (i.e., the 2% reduction or 98% of the baseline energy use amount).

Note the Key to abbreviations in the upper right corner. As the reduction or increase of energy use relates to production, "REL" is used when both production and energy use increase or both decrease, but by different relative amounts. The value that is marked "REL" increased (or decreased as the case may be) by the greater percentage. So, for example, "PR–UP REL" means that production increased by a greater percentage than energy use increased, and "EN–DN REL" means that energy use decreased by a greater percentage than production decreased. The eleven headings in the table and the column of numbers below show eleven different operational results that could occur in the subject compliance year. So, for example, "EN=RS, PR=RS" means that the participant's operations yielded energy use and production that matched the reduction schedule.

Referring for example to column 5 ("EN=RS, PR=DN"), one should interpret that the example illustrates what is required and how adjustments can be made. For example, column 5 involves a situation wherein for year 2016, actual energy use of 17.64 (i.e., equal to the amount required by the reduction schedule value), and actual production is 17. Since the participant was initially allocated energy efficiency credits based on estimated production of 20, the first step is to adjust the amount allocated so that the amount is consistent with actual production. Production decreased by 15%, so the participant must return 15% of initially allocated credits (i.e., 2.646 energy efficiency credits). Accordingly, the adjusted number of energy efficiency credits appropriately in the participant's account is 14.994 based on the actual production level. This represents the maximum amount of energy the participant is allowed to use based on the actual production level. The participant must offset excess energy use by acquiring credits.

The actual energy efficiency ratio is 1.038 (i.e., the ratio of actual energy use to actual production; 17.640/17), which is not in compliance with the reduction schedule amount of 0.882. Since energy use and production is established for the year, the participant must acquire energy efficiency credits to offset the operational inefficiency and comply with the reduction schedule. Note that even though a production drop caused the discrepancy in the energy efficiency ratio, it must be addressed through acquisition of energy efficiency credits. The reduction schedule allows the participant to use only 14.994 energy units (the amount of energy efficiency credits owned) for its actual production, and the participant must therefore acquire 2.646 energy efficiency credits to offset the excess energy use. Other examples show a variety of other operational outcomes and the corresponding deficit or surplus of credits.

As stated above, in a preferred embodiment the system and method would integrate the various items of information and calculations for a given operational scenario shown in FIG. 8 into the calculator interface shown in FIG. 7, or into a separate but related interface so that information provided by participants or contained in the registry or other database would automatically populate the corresponding fields.

EXAMPLES

The following examples are intended to illustrate the novel embodiments of the present invention without limiting them.

Example 1

An example of an energy efficiency financial instrument is provided below in Table 1.

TABLE 1

| | |
|---|---|
| Contract Size | Energy Efficiency Financial Instruments, representing 100 mega watt hours ("MWh") of electric energy not generated, equivalent to 10 Energy Efficiency Credits. |
| Quotation | US dollars/MWh |
| Minimum Tick Increment | $0.05 per MWh of electric energy = $5.00 per contract |
| Symbol | EEFI |
| Trading Hours | 8:30 a.m.-2:00 p.m. Central Time |
| Deliverable Instruments | Energy Efficiency Financial Instrument or Energy Efficiency Credits |
| Creation of Credits for EEFI | Projects submitted to and approved by Efficiency Valuation Organization ("EVO") will be awarded Energy Efficiency Credits in the corresponding vintages (issued to the parties registry account). Projects submitted to EVO must have received pre-approval of its monitoring and verification plan. Monitoring and verification must have been performed by an EVO certified monitoring and verification professional. Vintages correspond to the year in which the energy efficiency occurred or will occur. EEFI may be issued prospectively where the certainty or reduction is acceptable to the EVO. |
| Delivery Process | All transactions are delivered through the Clearing System and are held by the Registry on the trade day. |
| Clearing and Settlement Process | Transactions (with exception of bilateral agreements) are cleared on trade day. Full contract value settlement occurs on the next business day. Clearinghouse substitutes as a counter party to all transactions and guarantees performance until settlement is completed. Bilateral agreement financial arrangements are settled by the participating parties. |
| Closing Price | For each Vintage, the closing price will be based on the following criteria: 1. The last transaction executed on the Trading Platform during a trading session. 2. If at the close the best bid is above the last trade price or the best offer is below the last trade price, then the closing price will be the best bid/best offer price. 3. If no trades occur in the trading session, the closing price is the previous day's closing price unless the best bid is above the previous day's closing price or the best offer is below the previous day's closing price, then the closing price will be the best bid/best offer price. 4. The Exchange reserves the right to take into account other factors in determining closing prices. A block trade price will not serve as a closing price. |
| Price Limits | 20% up and down from the previous trading day's last traded price. |

Example 2

This is an illustration of a market-based method for realizing the energy efficiency goals of a country. This program would:

- Help the country achieve its industrial energy efficiency goals in an audited, enforced program
- Provide flexibility, including the ability to cooperate and trade with other business units to achieve goals
- Provide the basis to realize overall energy efficiency goals at least cost
- Provide financial rewards for enterprises that achieve energy efficiency improvements that go beyond targeted energy efficiency improvement goals
- Allow those business enterprises who find it difficult or costly to become more energy efficient to use a less costly compliance option by purchasing credits from other businesses

| Program Element | Program Design | |
|---|---|---|
| Overall Energy Efficiency Goal | Energy efficiency must be improved 20% by the end of calendar year 2020, relative to energy efficiency levels experienced in calendar year 2015 | |
| Program Participants | Initially: | Steel manufacturers |
| | Program Expansion: | Major users of raw steel, including manufacturers of autos, building products and heavy equipment. |
| Implementation Schedule | Phase one annual energy efficiency targets initially established for years 2015 through 2020, with phase 2 targets and participants to be determined in 2018. | |
| Energy Efficiency Metric (ratio) | Annual energy consumption (in thousands of btus) divided by annual volume of steel produced (in cubic meters); actual values to be set by grade of steel. | |
| Program Baseline | Energy Efficiency during calendar year 2015 | |
| Program Reduction Goals | Calendar year | Energy Efficiency Goal |
| | 2016 | 4% below baseline |
| | 2017 | 8% below baseline |
| | 2018 | 12% below baseline |
| | 2019 | 16% below baseline |
| | 2020 | 20% below baseline |
| Contract Size | Traded instruments are expressed in units equal to 400 metric tons of coal (9,200 million btus). All energy efficiency metrics are converted to absolute energy consumption levels. All fuels and electricity are quantified in btu value. | |
| Tick Size | $50 per contract | |
| Trading Activity, Annual Compliance Requirements | Participants that reduce energy efficiency to levels below annual energy efficiency reduction schedule will have surplus energy efficiency credits (EEC) that can be sold or banked and applied towards compliance with later-year energy efficiency compliance obligations. Participants that find it difficult or expensive to achieve annual energy efficiency reduction schedule values within their own operation must purchase EECs in amounts required to achieve the energy efficiency reduction schedule. | |
| Alternative Compliance Option | Participants that do not achieve annual energy efficiency reduction schedule values within their own operation may acquire compliance approved carbon dioxide emission reduction credits such as Certified Emission Reductions issued under the United Nations Clean Development Mechanism. 1,000 metric tons of approved emission reduction credits must be tendered for each 750 metric tons of coal equivalent compliance shortfall. | |
| Adjustments for Production Changes | Participants that realize production above baseline levels will have annual absolute energy consumption goals adjusted upward proportionally. Participants that realize production below baseline levels will have annual absolute energy consumption goals adjusted downward proportionally. | |
| Trading System and Registry | The registry and trading platform will hold all program data, including baseline and annual energy consumption and production, allocations and trading of EECs/EEFIs. | |
| Independent Verification of Performance | To be conducted by licensed Quality Control Entities for each participant's energy efficiency baseline and annual performance | |

What is claimed is:

1. A computer-implemented method for promoting more efficient energy use, the computer-implemented method comprising:

in a networked computer system comprising at least one remote entity computing device comprising an interactive graphical user interface, a registry database, an electronic platform and at least one computer communicatively coupled via a communications network:

receiving, by the at least one remote entity computing device, input via one or more fields of the interactive graphical user interface from at least one entity associated with the at least one remote entity computing device, the input including at least one of entity information, energy information and production information associated with the at least one entity;

transmitting, by the at least one remote entity computing device via the communications network, the received input to the at least one computer;

creating, by the at least one computer, a reduction schedule that sets predetermined limits on energy use as a function of production activity for each of the at least one entity, the reduction schedule covering at least one time period, the production activity comprising at least one of a production of goods, a provision of services and a generation of revenues, the registry database, the reduction schedule based on the transmitted input at least in part;

monitoring and measuring over the communications network, by at least one remote device, for each entity of the at least one entity, an actual energy use and an actual production activity during the at least one time period;

determining, by the at least one computer based on information provided by the at least one device, for each entity, an actual energy efficiency ratio, the actual energy efficiency ratio being a ratio of the measured actual energy use to the measured actual production activity;

creating, by the at least one computer, a plurality of electronic transferable energy efficiency credits, where each energy efficiency credit represents an amount of energy;

allocating, by the at least one computer, at least a portion of the energy efficiency credits to each of the at least one entity, by transmitting a signal over the communications network to the registry database to cause the registry database to update a value representing at least the portion of the energy efficiency credits in respective accounts on the registry database for each of the at least one entity;

comparing, by the at least one computer, for each entity, the actual energy efficiency ratio to the reduction schedule;

determining, by the at least one computer, for each entity, whether the actual energy efficiency ratio is within the predetermined limits set by the reduction schedule, based on the comparison of the actual energy efficiency ratio to the reduction schedule;

issuing, by the at least one computer, at least a portion of the allocated energy efficiency credits to one or more entities among the at least one entity, by transmitting a signal over the communications network to the registry database to cause the registry database to transfer at least the portion of the allocated energy efficiency credits into the respective accounts of the one or more entities when the respective actual energy efficiency ratio is within the predetermined limits set by the reduction schedule;

issuing, by the at least one computer, a requirement for remaining entities among the at least one entity to purchase one or more energy efficiency credits on the electronic trading platform when the respective actual energy efficiency ratio is outside of the predetermined limits set by the reduction schedule;

transmitting, by the at least one computer, over the communications network, compliance information to at the least one remote entity computing device, said compliance information comprising at least one of the reduction schedule, the actual energy efficiency ratio, the issued portion of the allocated energy efficiency credits and the requirement to purchase the one or more energy efficiency credits;

displaying, in at least one window of the interactive graphical user interface of the at least one remote entity computing device, the transmitted compliance information; and continually updating at least a portion of the compliance information displayed in the interactive graphical user interface of the at least one remote entity computing device to reflect changes in the monitored and measured actual energy use and the actual production activity.

2. The method of claim 1, further comprising correlating a number of environmental credits for greenhouse gas reduction as being equivalent to a number of the energy efficiency credits and substituting the environmental credits for some or all of the energy efficiency credits when determining a compliance with the reduction schedule.

3. The method of claim 1, further comprising allocating the energy efficiency credits to each of the at least one entity by transmitting a signal from the at least one computer via the communications network to the registry database to cause the registry database to transfer the allocated energy efficiency credits into the respective accounts of the at least one entity pursuant to an auction held on an electronic auction platform, or based on the entity's industry, quantity of production, type of product or service, mode of operation, adoption of energy efficient technology, type of facilities or other characteristics of the entity.

4. The method of claim 1, further comprising allocating the energy efficiency credits with a vintage year that makes the allocated energy efficiency credits usable for compliance in predetermined years by transmitting a signal from the at least one computer via the communications network to the registry database to cause the registry database to transfer the allocated energy efficiency credits with the vintage year into the respective accounts of the at least one entity.

5. The method of claim 1, further comprising allocating the energy efficiency credits to the at least one entity prior to the at least one time period, by transmitting a signal from the at least one computer via the communications network to the registry database to cause the registry database to transfer the allocated energy efficiency credits into the respective accounts of the at least one entity based on a previous measure of energy use and a previous measure of production activity, with reference to the reduction schedule.

6. The method of claim 1, further comprising allocating the energy efficiency credits to the at least one entity at the end of the at least one time period, by transmitting a signal from the at least one computer via the communications network to the registry database to cause the registry database to transfer the allocated energy efficiency credits into the respective accounts of the at least one entity to an extent that the at least one entity reduces the measured actual energy efficiency ratio below the reduction schedule.

7. The method of claim 1, wherein the electronic trading platform is usable by each of the at least one entity that meets certain requirements including at least one of being a member of an organization, being in a certain industry, having a certain level of financial resources, or having a record of energy consumption that is above a certain threshold.

8. The method of claim 1, further comprising calculating the actual energy efficiency ratio at the end of the at least one time period and removing or retiring a quantity of the energy efficiency credits that equal a value in the reduction schedule for the corresponding time period, wherein removing or retiring the quantity of the energy efficiency credits comprises transmitting a signal from the at least one computer via the communications network to the registry database to cause the registry database to transfer the quantity of the energy efficiency credits out of the respective accounts of the at least one entity with the energy efficiency credits that remain after the corresponding time period capable of being sold or banked for use in complying with the reduction schedule in a subsequent time period.

9. The method of claim 1, wherein the actual energy efficiency ratio, the reduction schedule and a compliance with the reduction schedule are determined with reference to the measured actual energy use and the measured production activity of the at least one entity, the method further comprising aggregating or disaggregating business units and companies affiliated with the at least one entity in order to achieve the compliance with the reduction schedule.

10. The method of claim 1, further comprising creating a tradable energy financial instrument representing a number of the energy efficiency credits, and complying with the reduction schedule by at least one of improving an efficiency of production equipment, and acquiring and surrendering at least a portion of the energy efficiency credits or energy financial instruments to offset a lack of efficiency improvement in the production equipment.

11. The method of claim 10, wherein the tradable energy financial instrument comprises a standardized spot, futures or option contract that results in a purchase or sale of the energy efficiency credits once traded in an over-the-counter transaction, via the electronic trading platform or an electronic auction platform.

12. The method of claim 1, wherein measuring the actual energy use comprises determining a quantity representing a total electricity and other sources of energy that the at least one entity consumes or that is used in the at least one entity's activities to produce products, provide services, generate financial revenues or conduct other activities over the at least one time period, and wherein measuring the actual production activity comprises determining quantities of the products produced, the services provided, the financial revenues generated, or the other activities conducted over the same at least one time period.

13. The method of claim 12, wherein the actual energy efficiency ratio is expressed as a number of universal energy units calculated from the quantity of the total electricity and energy sources consumed, and a type and a quantity of production activities undertaken, multiplied by a selectable factor.

14. The method of claim 12, wherein the measured actual energy use excludes energy from certain specified sources, including renewable energy sources, the at least one time period is a one year compliance period, and the reduction schedule covers a series of one year compliance time periods and requires more efficient energy use during each subsequent one year time period.

15. The method of claim 1, wherein the energy efficiency credits are associated with energy financial instruments and the energy financial instruments represent a number of universal energy units, and wherein the at least one entity comprises of at least one of one or more businesses or other entities that consume energy in the production of the goods, the provision of the services, the generation of the revenues or conduct of activities, the method further comprising determining a baseline energy efficiency ratio for each of the at least one entity from information about respective entity's actual energy consumption and production during a specified period of time, and creating the reduction schedule based on the baseline energy efficiency ratio.

16. The method of claim 15, wherein the baseline energy efficiency ratio and the reduction schedule are the same for each of the at least one entity that has certain common characteristics, including producing same types of products or providing same types of services, and wherein the baseline energy efficiency ratio, the reduction schedule and compliance requirements are specified by a regulatory entity.

17. The method of claim 1, wherein the at least one computer is in communication with the registry database, the registry database including electronic accounts for each of the at least one entity with information about that entity's actual energy efficiency ratio and underlying measures of energy use and production, increases and decreases in the measured actual energy efficiency ratio and the measured actual production activity, a number of energy efficiency credits held, and transactions related to the energy efficiency credits.

18. The method of claim 17, further comprising receiving, at the registry database, information about the measured actual energy efficiency ratio and measured actual production activity of the at least one entity during the at least one time period, to verify a compliance with the reduction schedule.

19. The method of claim 18, further comprising evaluating the information received at the registry database, and if there are discrepancies, adjusting the actual energy efficiency ratio for the corresponding time period.

20. The method of claim 17, further comprising allocating additional energy efficiency credits to the at least one entity by transmitting a signal from the at least one computer via the communications network to the registry database to cause the registry database to transfer the additional energy efficiency credits into the respective accounts of the at least one entity when the measured actual production activity is greater than an estimated production activity for the corresponding time period, or revoking previously issued energy efficiency credits from the at least one entity by transmitting a signal from the at least one computer via the communications network to the registry database to cause the registry database to transfer at least a portion of the previously issued energy efficiency credits out of the respective accounts of the at least one entity when the measured actual production activity is less than the estimated production activity for the corresponding time period.

21. The method of claim 1, wherein the electronic trading platform is comprised of order-matching software operating on an internet-accessible platform comprised of computers connected to the communications network, that is integrated with settlement processing to form an integrated system, the registry database embodied in at least one computing device that imparts certain program rules and maintains records reflecting transactions and ownership of energy efficiency credits, and an electronic auction platform, wherein the electronic trading platform is configured to execute a clearing process wherein one or more third parties guarantee a delivery of energy efficiency credits by a seller, payment for the energy efficiency credits by a buyer, or obligations of both the seller and the buyer, and the electronic trading platform and the registry database are communicatively connected to the electronic auction platform.

22. The method of claim 21, wherein the integrated system includes an interface configured to receive information about energy consumption, energy activities and the production of the goods, the services, revenue or other activities, and to display information about the at least one entity's respective actual energy efficiency ratio and corresponding shortage of energy efficiency credits, or surplus energy efficiency credits that can be sold or banked.

23. The method of claim 21, wherein the registry database applies certain rules to the at least one entity subject to energy efficiency requirements, and which further comprises limiting one or more of (a) a number of the energy efficiency credits that an entity can recognize in the at least one time period, or (b) a number of the energy efficiency credits that the entity can bank or sell, or (c) a number of the energy efficiency credits that the entity is required to buy in order to comply with the reduction schedule.

24. A computer system for promoting more efficient energy use, the computer system comprising:
at least one remote entity computing device comprising an interactive graphical user interface, at least one computing device, a registry database and an electronic trading platform, the at least one remote entity computing device, the registry database, the electronic trading platform and the at least one computing device being in communication via a communications network,
said at least one remote entity computing device configured to receive input via one or more fields of the interactive graphical user interface from at least one entity associated with the at least one remote entity computing device, the input including at least one of entity information, energy information and production information associated with the at least one entity, and transmit the received input to the at least one computing device,
said at least one computing device comprising computer-readable instructions stored in memory and a processor, said computer-readable instructions, when executed, causing the at least one computing device to:

create a reduction schedule that sets predetermined limits on energy use as a function of production activity for each of the at least one entity, the reduction schedule covering at least one time period, the production activity comprising at least one of a production of goods, a provision of services or a generation of revenues, the reduction schedule based on the transmitted input at least in part, receive, for each entity of the at least one entity, an actual energy use and an actual production activity, each of the actual energy use and the actual production activity being monitored and measured, over the communications network, by at least one remote device during the at least one time period, determine, for each entity, an actual energy efficiency ratio based on information received from the at least one device, the actual energy efficiency ratio being a ratio of the measured actual energy use to the measured actual production activity, create a plurality of electronic transferable energy efficiency credits, where each energy efficiency credit represents an amount of energy, allocate at least a portion of the energy efficiency credits to each of the at least one entity by transmitting a signal via the communications network to the registry database to cause the registry database to update a value representing at least the portion of the energy efficiency credits into respective accounts on the registry database for each of the at least one entity, compare, for each entity, the actual energy efficiency ratio to the reduction schedule, determine, for each entity, whether the actual energy efficiency ratio is within the predetermined limits set by the reduction schedule, based on the comparison of the actual energy efficiency ratio to the reduction schedule, issue at least a portion of the allocated energy efficiency credits to one or more entities among the at least one entity by transmitting a signal via the communications network to the registry database to cause the registry database to update a value representing at least the portion of the allocated energy efficiency credits into the respective accounts of the one or more entities, when the respective actual energy efficiency ratio is within the predetermined limits set by the reduction schedule, issue a requirement for remaining entities among the at least one entity to purchase one or more energy efficiency credits on the electronic trading platform when the respective actual energy efficiency ratio is outside of the predetermined limits set by the reduction schedule, transmit compliance information, over the communications network, to the at least one remote entity computing device, said compliance information comprising at least one of the reduction schedule, the actual energy efficiency ratio, the issued portion of the allocated energy efficiency credits and the requirement to purchase the one or more energy efficiency credits, display, in at least one window of the interactive graphical user interface of the at least one remote entity computing device, the transmitted compliance information, and continually update at least a portion of the compliance information displayed in the interactive graphical user interface of the at least one remote entity computing device to reflect changes in the monitored and measured actual energy use and the actual production activity.

25. A computer system for promoting more efficient energy use, the computer system comprising:

at least one remote entity computing device comprising an interactive graphical user interface, one or more computers, a registry database and an electronic trading platform, the at least one remote entity computing device, the registry database, the electronic trading platform and the one or more computers being in communication via a communications network, said at least one remote entity computing device configured to receive input via one or more fields of the interactive graphical user interface from at least one entity associated with the at least one remote entity computing device, the input including at least one of entity information, energy information and production information associated with the at least one entity, and transmit the received input to the one or more computers, the one or more computers comprising one or more processors executing computer executable instructions stored in a non-transitory memory, said computer executable instructions defining:

a first executable portion creating a reduction schedule that sets predetermined limits on energy use as a function of production activity for each of the at least one entity, the reduction schedule covering at least one time period, the production activity comprising at least one of a production of goods, a provision of services or a generation of revenues, the reduction schedule based on the transmitted input at least in part;

a second executable portion receiving, for each entity of the at least one entity, an actual energy use and an actual production activity, each of the actual energy use and the actual production activity being monitored and measured over the communications network by at least one remote device during the at least one time period, a third executable portion determining, for each entity, an actual energy efficiency ratio, the actual energy efficiency ratio being a ratio of the measured actual energy use to the measured actual production activity, a fourth executable portion creating a plurality of electronic transferable energy efficiency credits, where each energy efficiency credit represents an amount of energy;

a fifth executable portion allocating at least a portion of the energy efficiency credits to each of the at least one entity by transmitting a signal via the communications network to the registry database to cause the registry database to update a value representing at least the portion of the energy efficiency credits into respective accounts on the registry database for each of the at least one entity;

a sixth executable portion comparing, for each entity, the actual energy efficiency ratio to the reduction schedule;

a seventh executable portion determining, for each entity, whether the actual energy efficiency ratio is within the predetermined limits set by the reduction schedule, based on the comparison of the actual energy efficiency ratio to the reduction schedule;

an eighth executable portion issuing, by the at least one computer, at least a portion of the allocated energy efficiency credits to one or more entities among the at least one entity by transmitting a signal via the communications network to the registry database to cause the registry database to update a value representing at least the portion of the allocated energy efficiency credits into the respective accounts of the one or more entities, when the respective actual energy efficiency ratio is within the predetermined limits set by the reduction schedule, said eighth executable portion issuing, by the at least one computer, a requirement for remaining entities among the at least one entity to purchase one or more energy efficiency credits on the electronic trading platform when the respective actual energy efficiency ratio is outside of the predetermined limits set by the reduction schedule; and a ninth executable portion transmitting compliance information over the communications network to the at least one remote entity computing device, said compliance information associated with the respective at least on entity and comprising at least one of the reduction schedule, the actual energy efficiency ratio, the issued portion of the allocated energy efficiency credits, and the requirement to purchase the one or more energy efficiency credits, wherein the at least one remote entity computing device is configured to display the transmitted compliance information in at least one window of the interactive graphical user interface, and at least a portion of the compliance information displayed in the interactive graphical user interface of the at least one remote entity computing device is continually updated to reflect changes in the monitored and measured actual energy use and the actual production activity.

* * * * *